United States Patent
Park et al.

(10) Patent No.: US 11,128,426 B2
(45) Date of Patent: Sep. 21, 2021

(54) RESOURCE ALLOCATION CONSTRAINT MITIGATION

(71) Applicant: QUALCOMM Incorporated, San Diego, CA (US)

(72) Inventors: Sungwoo Park, San Diego, CA (US); Srinivas Yerramalli, San Diego, CA (US); Wooseok Nam, San Diego, CA (US); Xiaoxia Zhang, San Diego, CA (US); Tao Luo, San Diego, CA (US); Jing Sun, San Diego, CA (US); Arumugam Chendamarai Kannan, San Diego, CA (US); Vinay Chande, San Diego, CA (US); Kaushik Chakraborty, San Diego, CA (US); Olufunmilola Omolade Awoniyi-Oteri, San Diego, CA (US); Sony Akkarakaran, Poway, CA (US); Mostafa Khoshnevisan, San Diego, CA (US); Zhifei Fan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/839,640

(22) Filed: Apr. 3, 2020

(65) Prior Publication Data
US 2020/0366441 A1 Nov. 19, 2020

Related U.S. Application Data

(60) Provisional application No. 62/849,750, filed on May 17, 2019.

(51) Int. Cl.
*H04W 72/04* (2009.01)
*H04L 5/00* (2006.01)
*H04L 27/26* (2006.01)

(52) U.S. Cl.
CPC .......... *H04L 5/0053* (2013.01); *H04L 5/0007* (2013.01); *H04L 27/2607* (2013.01);
(Continued)

(58) Field of Classification Search
CPC .......... H04W 72/0413; H04W 72/042; H04W 72/0426; H04W 72/0433; H04W 72/0453
See application file for complete search history.

(56) References Cited

U.S. PATENT DOCUMENTS

2018/0331870 A1   11/2018 Sun et al.
2019/0222455 A1*  7/2019 Sahin .................. H04L 27/2636

OTHER PUBLICATIONS

Alphan S., et al., "Flexible DFT-S-OFDM: Solutions and Challenges", IEEE Communications Magazine, IEEE Service Center, Piscataway, US, vol. 54, No. 11, Nov. 1, 2016 (Nov. 1, 2016), pp. 106-112, XP011634873, ISSN: 0163-6804, DOI: 10.1109/MCOM.2016.1600330CM [retrieved on Nov. 15, 2016] Section Flexible DFT-S-OFDM: Schemes 11 ; p. 108.
(Continued)

*Primary Examiner* — Kevin Kim
(74) *Attorney, Agent, or Firm* — Holland & Hart LLP

(57) ABSTRACT

Methods, systems, and devices for time domain single carrier (SC) waveform communications are described. A user equipment (UE) may generate an SC waveform by resampling (e.g., up-sampling) mapped information bits prior to insertion of a cyclic prefix (CP) or guard interval (GI). Performing resampling prior to CP/GI insertion allows for resource allocation flexibility and a base station may allocate resources for the SC waveform in accordance with this flexibility. For example, a base station may not be limited or restricted to a certain number of resources for SC waveform communications and may therefore determine a resource allocation for the UE based on the capability of the UE to perform resampling prior to CP/GI insertion. The resampling may be performed according to a set of param-
(Continued)

eters including a resampling ratio, which may be indicated to the UE via control signaling (e.g., from the base station).

30 Claims, 19 Drawing Sheets

(52) U.S. Cl.
CPC ...... *H04L 27/2613* (2013.01); *H04L 27/2678* (2013.01); *H04W 72/0453* (2013.01)

(56) References Cited

OTHER PUBLICATIONS

Berardinelli G L., et al., "On the Potential of Zero-Tail DFT-Spread-OFDM in 5G Networks", 2014 IEEE 80th Vehicular Technology Conference (VTC2014—FALL), IEEE, Sep. 14, 2014 (Sep. 14, 2014), pp. 1-6, XP032694773, DOI: 10.1109/VTCFALL.2014. 6966089 [retrieved on Nov. 24, 2014] Section I.
Berardinelli G., et al., "Generalized DFT-Spread-OFDM as 5G Waveform" IEEE Communications Magazine Nov. 2016 (Year: 2016), 11 Pages.
International Search Report and Written Opinion—PCT/US2020/026847—ISA/EPO—dated Jul. 15, 2020.
Mahyar N., et al., "Discrete Fourier Transform Spread Zero Word OFDM", 2017 IEEE International Black Sea Conference Communications and Networking (Blackseacom), IEEE, Jun. 5, 2017 (Jun. 5, 2017), pp. 1-5. XP033311515, DOI: 10.1109/BLACKSEACOM. 2017.8277686 [retrieved on Jan. 31, 2018] Section I.

\* cited by examiner

RESOURCE ALLOCATION CONSTRAINT MITIGATION

CROSS REFERENCE

The present Application for Patent claims the benefit of U.S. Provisional Patent Application No. 62/849,750 by PARK et al., entitled "RESOURCE ALLOCATION CONSTRAINT MITIGATION," filed May 17, 2019, assigned to the assignee hereof, and expressly incorporated by reference herein.

FIELD OF TECHNOLOGY

The following relates generally to wireless communications and more specifically to resource allocation constraint mitigation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communications devices (e.g., a UE or base stations) may transmit and receive information using single carrier (SC) waveforms. The SC waveforms may include a cyclic prefix (CP) or guard interval (GI) appended to the transmitted information or otherwise included in the transmission. In some cases, processing techniques for generating SC waveforms may restrict available time-frequency resources used for communication of the SC waveform.

SUMMARY

The described techniques relate to improved methods, systems, devices, and apparatuses that support single carrier (SC) waveforms. Generally, the described techniques enable a user equipment (UE) or a base station to transmit and receive SC waveforms (e.g., corresponding to uplink or downlink transmissions) using a SC configuration. The SC configuration may indicate parameters associated with the SC waveform such as resampling parameters (e.g., a resampling ratio), pulse shaping information, or the like. A transmitting device may transmit uplink or downlink communications according to the SC configuration and a receiving device may receive the uplink or downlink communications according to the SC configuration. In some cases, a UE and a base station may employ a SC configuration to identify or convey a resource allocation (e.g., resource elements (REs) or resource blocks (RBs)) allocated for the SC waveform.

In some cases, a transmitting device may employ an SC configuration (e.g., indicating time domain SC parameters such as resampling ratio) for generating an SC waveform that involves resampling prior to insertion of a cyclic prefix (CP) or a guard interval (GI). Performing resampling prior to CP/GI insertion may provide resource allocation freedom and flexibility (e.g., to mitigate restrictions on available frequency resources such as REs and RBs). Reducing or eliminating the restriction on resource allocation for an SC waveform may provide for higher data rates and capacity, as well as spectral efficiency.

According to some aspects, a base station may transmit an indication of an SC configuration or a resource allocation to the UE via an indication in a control message (via a radio resource control (RRC) message, downlink control information (DCI), etc.). The UE may receive and decode the control message and identify the SC configuration or resource allocation. The UE and the base station may implement the SC configuration to receive or transmit SC downlink or uplink communications.

A method of wireless communications at a transmitting device is described. The method may include identifying a resource allocation indicating a number of resources allocated under a limitation on the number of resources for communication of a time domain single carrier waveform with the receiving device and communicating the time domain single carrier waveform with the receiving device in accordance with the resource allocation. In some aspects, the transmitting device may be operating in a wireless cell of the receiving device that may support the time domain single carrier waveform and a second waveform different from the time domain single carrier waveform. In some example aspects, a data sample timing of the time domain single carrier waveform may be aligned in time with a symbol boundary of a communication of the second waveform by at least one other transmitting device.

An apparatus for wireless communications at a transmitting device is described. The apparatus may include a processor, memory coupled with the processor, and instructions stored in the memory. The instructions may be executable by the processor to cause the apparatus to identify a resource allocation indicating a number of resources allocated under a limitation on the number of resources for communication of a time domain single carrier waveform with the receiving device and communicate the time domain single carrier waveform with the receiving device in accordance with the resource allocation. In some aspects, the transmitting device may be operating in a wireless cell of the receiving device that may support the time domain single carrier waveform and a second waveform different from the time domain single carrier waveform. In some example aspects, a data sample timing of the time domain single carrier waveform may be aligned in time with a symbol boundary of a communication of the second waveform by at least one other transmitting device.

Another apparatus for wireless communications at a transmitting device is described. The apparatus may include means for identifying a resource allocation indicating a number of resources allocated under a limitation on the number of resources for communication of a time domain single carrier waveform with the receiving device and communicating the time domain single carrier waveform with the receiving device in accordance with the resource allocation. In some aspects, the transmitting device may be operating in a wireless cell of the receiving device that may support the time domain single carrier waveform and a second waveform different from the time domain single carrier waveform. In some example aspects, a data sample timing of the time domain single carrier waveform may be aligned in time with a symbol boundary of a communication of the second waveform by at least one other transmitting device.

A non-transitory computer-readable medium storing code for wireless communications at a transmitting device is described. The code may include instructions executable by a processor to identify a resource allocation indicating a number of resources allocated under a limitation on the number of resources for communication of a time domain single carrier waveform with the receiving device and communicate the time domain single carrier waveform with the receiving device in accordance with the resource allocation. In some aspects, the transmitting device may be operating in a wireless cell of the receiving device that may support the time domain single carrier waveform and a second waveform different from the time domain single carrier waveform. In some example aspects, a data sample timing of the time domain single carrier waveform may be aligned in time with a symbol boundary of a communication of the second waveform by at least one other transmitting device.

In some examples of the method, apparatuses, and non-transitory computer-readable medium described herein, the limitation on the number of resources may be preconfigured at the transmitting device and the receiving device.

Some examples of the method, apparatuses, and non-transitory computer-readable medium described herein may further include operations, features, means, or instructions for identifying a capability of the transmitting device for communicating the time domain single carrier waveform, the capability indicating the limitation on the number of resources for communication of the time domain single carrier waveform. In some aspects, the transmitting device may include a UE and the receiving device may include a base station, and some examples of the method, apparatuses, and non-transitory computer-readable medium described herein may further include operations, features, means, or instructions for transmitting, to the base station, a UE capability message including an indication of the capability of the UE.

In some examples of the method, apparatuses, and non-transitory computer-readable medium described herein, the transmitting device may include a base station and the receiving device may include a UE.

In some examples of the method, apparatuses, and non-transitory computer-readable medium described herein, the capability may include operations, features, means, or instructions for receiving or transmitting the time domain single carrier waveform based on the resampling ratio.

In some examples of the method, apparatuses, and non-transitory computer-readable medium described herein, transmitting the time domain single carrier waveform may include operations, features, means, or instructions for resampling a set of mapped information bits for the time domain single carrier waveform based on the resampling ratio, and inserting a CP or a GI into the resampled set of mapped information bits after the resampling.

In some examples of the method, apparatuses, and non-transitory computer-readable medium described herein, resampling the set of mapped information bits may include operations, features, means, or instructions for transforming the set of mapped information bits into a frequency domain representation based on the number of resources, inserting a set of zero values into the transformed set of mapped information bits based on the resampling ratio, and transforming the frequency domain representation into a time domain representation of the time domain single carrier waveform based on the resampling ratio.

In some examples of the method, apparatuses, and non-transitory computer-readable medium described herein, the resampling ratio indicates a ratio between a set of resampled information bits in a time domain and a number of resources supported by the transmitting device.

In some examples of the method, apparatuses, and non-transitory computer-readable medium described herein, the resampling ratio may be an integer value.

In some examples of the method, apparatuses, and non-transitory computer-readable medium described herein, the resampling ratio may be fractional. In some examples of the method, apparatuses, and non-transitory computer-readable medium described herein, the transmitting device may include a UE, the at least one other transmitting device may include at least one second UE, the receiving device may include a base station, the UE and the at least one second UE may be part of a group of UEs supported by the base station, the at least one second UE of the group of UEs supports OFDM waveform communication with the base station, and the communication of the second waveform by the at least one other transmitting device includes an OFDM waveform communication by the at least one second UE.

In some examples of the method, apparatuses, and non-transitory computer-readable medium described herein, the data sample timing of the time domain single carrier waveform may be aligned in time with an OFDM symbol boundary of the OFDM waveform communication of the at least one second UE.

In some examples of the method, apparatuses, and non-transitory computer-readable medium described herein, the number of resources corresponds to a number of REs, a number of RBs, or any combination thereof.

A method of wireless communications at a receiving device is described. The method may include identifying a capability of a transmitting device for communication of a time domain single carrier waveform with the receiving device, the capability indicating a limitation on a number of resources allocated for communicating the time domain single carrier waveform with the receiving device, determining a resource allocation for communicating the time domain single carrier waveform based on the limitation on the number of resources imposed by the UE, and indicating, to the transmitting device, the resource allocation for communicating the time domain single carrier waveform. In some aspects, a wireless cell of the receiving device may support the time domain single carrier waveform and a second waveform different from the time domain single carrier waveform. In some example aspects, a data sample timing of the time domain single carrier waveform may be aligned in time with a symbol boundary of a communication of the second waveform by at least one other transmitting device.

An apparatus for wireless communications at a receiving device is described. The apparatus may include a processor, memory coupled with the processor, and instructions stored in the memory. The instructions may be executable by the processor to cause the apparatus to identify a capability of a transmitting device for communication of a time domain single carrier waveform with the receiving device, the capability indicating a limitation on a number of resources allocated for communicating the time domain single carrier waveform with the receiving device, determine a resource allocation for communicating the time domain single carrier waveform based on the limitation on the number of resources imposed by the UE, and indicate, to the transmitting device, the resource allocation for communicating the time domain single carrier waveform. In some aspects, a wireless cell of the receiving device may support the time domain single carrier waveform and a second waveform different from the time domain single carrier waveform. In some example aspects, a data sample timing of the time domain single carrier waveform may be aligned in time with a symbol boundary of a communication of the second waveform by at least one other transmitting device.

Another apparatus for wireless communications at a receiving device is described. The apparatus may include means for identifying a capability of a transmitting device for communication of a time domain single carrier waveform with the receiving device, the capability indicating a limitation on a number of resources allocated for communicating the time domain single carrier waveform with the receiving device, determining a resource allocation for communicating the time domain single carrier waveform based on the limitation on the number of resources imposed by the UE, and indicating, to the transmitting device, the resource allocation for communicating the time domain single carrier waveform. In some aspects, a wireless cell of the receiving device may support the time domain single carrier waveform and a second waveform different from the time domain single carrier waveform. In some example aspects, a data sample timing of the time domain single carrier waveform may be aligned in time with a symbol boundary of a communication of the second waveform by at least one other transmitting device.

A non-transitory computer-readable medium storing code for wireless communications at a receiving device is described. The code may include instructions executable by a processor to identify a capability of a transmitting device for communication of a time domain single carrier waveform with the receiving device, the capability indicating a limitation on a number of resources allocated for communicating the time domain single carrier waveform with the receiving device, determine a resource allocation for communicating the time domain single carrier waveform based on the limitation on the number of resources imposed by the UE, and indicate, to the transmitting device, the resource allocation for communicating the time domain single carrier waveform. In some aspects, a wireless cell of the receiving device may support the time domain single carrier waveform and a second waveform different from the time domain single carrier waveform. In some example aspects, a data sample timing of the time domain single carrier waveform may be aligned in time with a symbol boundary of a communication of the second waveform by at least one other transmitting device.

In some aspects, the receiving device may include a base station and the transmitting device may include a UE, and some examples of the method, apparatuses, and non-transitory computer-readable medium described herein may further include operations, features, means, or instructions for receiving a UE capability message from the UE, the UE capability message including an indication of the capability of the UE.

In some examples of the method, apparatuses, and non-transitory computer-readable medium described herein, the limitation on the number of may be preconfigured at the transmitting device and the receiving device.

In some examples of the method, apparatuses, and non-transitory computer-readable medium described herein, the capability of the transmitting device may include a resampling ratio for the time domain single carrier waveform supported by the transmitting device. Some examples of the method, apparatuses, and non-transitory computer-readable medium described herein may further include operations, features, means, or instructions for determining the resource allocation based on the resampling ratio, and receiving or transmitting the time domain single carrier waveform according to the resource allocation based on the resampling ratio.

In some examples of the method, apparatuses, and non-transitory computer-readable medium described herein, transmitting the time domain single carrier waveform may include operations, features, means, or instructions for resampling a set of mapped information bits for the time domain single carrier waveform based on the resampling ratio, and inserting a CP or a GI into the resampled set of mapped information bits after the resampling.

In some examples of the method, apparatuses, and non-transitory computer-readable medium described herein, resampling the set of mapped information bits may include operations, features, means, or instructions for transforming the set of mapped information bits into a frequency domain representation based on the number of resources, inserting a set of zero values into the transformed set of mapped information bits based on the resampling ratio, and transforming the frequency domain representation into a time domain representation of the time domain single carrier waveform based on the resampling ratio.

In some examples of the method, apparatuses, and non-transitory computer-readable medium described herein, the resampling ratio may be an integer value.

In some examples of the method, apparatuses, and non-transitory computer-readable medium described herein, the resampling ratio may be fractional.

In some examples of the method, apparatuses, and non-transitory computer-readable medium described herein, the receiving device may include a base station, the transmitting device may include a UE, the at least one other transmitting device may include at least one second UE, the UE and the at least one second UE may be part of a group of UEs supported by the base station, the at least one second UE of the group of UEs supports OFDM waveform communications with the base station, and the communication of the second waveform by the at least one other transmitting device may include an OFDM waveform communication by the at least one second UE.

Some examples of the method, apparatuses, and non-transitory computer-readable medium described herein may further include operations, features, means, or instructions for communicating an OFDM waveform with the at least one UE, where a data sample timing of the time domain single carrier waveform may be aligned in time with an OFDM symbol boundary of the OFDM waveform.

In some examples of the method, apparatuses, and non-transitory computer-readable medium described herein, the number of resources corresponds to a number of REs, a number of RBs, or any combination thereof.

DETAILED DESCRIPTION

Some wireless communications devices (e.g., user equipment (UE) or base stations) may transmit and receive information using single carrier (SC) waveforms. The SC waveforms may include a cyclic prefix (CP) or guard interval (GI) appended to the transmitted information or otherwise included in the transmission. For some wireless communications devices communicating using high frequency bands, processing complexity (e.g., at a transmitting wireless device and/or a receiving wireless device, which may respectively be referred to herein as a transmitting device and a receiving device) of an SC waveform may increase based on the higher frequency that is used for transmission. In some examples, wireless communication devices may implement SC receivers and SC transmitters in the time domain, which may lower complexity at the receivers and transmitters. The time domain implementations, however, may restrict resource allocation. For example, in some time domain implementations, the insertion of the CP and GI used in SC waveform generation (e.g., prior to resampling) may restrict allocation of available frequency resources (e.g., resource elements (RE) and resource blocks (RB)).

According to some aspects, a transmitting device (e.g., a UE or a base station) may generate a time domain SC waveform through the use of a resampler. The resampler may be capable of resampling (e.g., up-sampling) mapped information bits (e.g., after constellation mapping) prior to the insertion of a CP or GI for the time domain SC waveform. The resampling may allow for flexible resource allocation for the time domain SC waveform and may be performed according to a set of parameters. The set of parameters may include a resampling ratio, which may be an integer value or a fractional value (e.g., a rational number comprising a ration of two integers), and in some cases, may be indicated to the UE by the base station (e.g., via a radio resource control (RRC) message, downlink control information (DCI)).

In some examples, a UE capable of performing resampling in this manner may indicate, to the base station, information relating to the capability of the UE. Using this information, the base station may determine a resource allocation (e.g., a number of REs or RBs allocated for communication of the time domain SC waveform) for transmission of the time domain SC waveform, and the base station may transmit an indication of the resource allocation to the UE.

Aspects of the disclosure are initially described in the context of wireless communications systems. Aspects of the disclosure are then described in the context of signal processing flows, timing diagrams, and a process flow. Aspects of the disclosure are further illustrated by and described with reference to apparatus diagrams, system diagrams, and flowcharts that relate to handling transport block-level parity check bits for interrupted transmissions.

Figure 1:
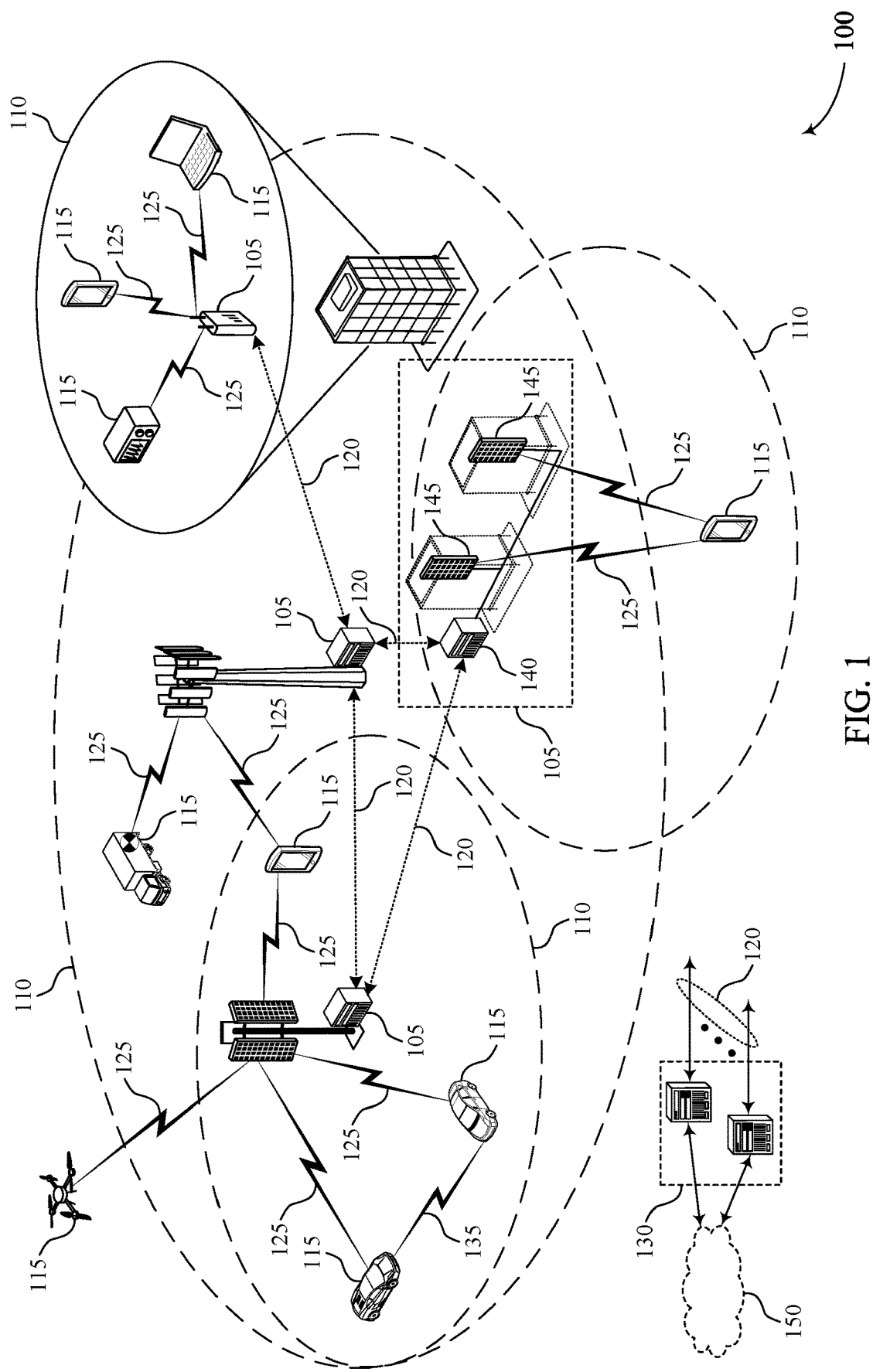
FIG. 1 illustrates an example of a wireless communications system that supports resource allocation constraint mitigation in accordance with aspects of the present disclosure.

FIG. 1 illustrates an example of a wireless communications system 100 that supports handling transport block-level parity check bits for interrupted transmissions in accordance with aspects of the present disclosure. The wireless communications system 100 may include base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, the wireless communications system 100 may support enhanced broadband communications, ultra-reliable (e.g., mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, and/or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105), or indirectly (e.g., via core network 130), or both. In some examples, backhaul links 120 may be or include one or more wireless links.

One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, a machine type communications (MTC) device, or the like, which may be implemented in various objects such as appliances, vehicles, meters, or the like.

The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (e.g., a bandwidth part (BWP)) that is operated according to physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 megahertz (MHz)). Devices of the wireless communications system 100 (e.g., base stations 105, UEs 115, or both) may have hardware configurations that support communications over a particular carrier bandwidth or may be configurable to support communications over one of a set of carrier bandwidths. In some examples, the wireless communications system 100 may include base stations 105 and/or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a CP. A carrier may be divided into BWPs having the same or different numerologies. In some examples, a UE 115 may be configured with multiple BWPs. In some cases, a single BWP for a carrier is active at a given time, and communications for the UE 115 may be restricted to active BWPs.

Time intervals for base stations 105 or UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some cases, a frame may be divided into subframes, and each subframe may be further divided into a number of slots. Alternatively, each frame may include a variable number of slots, and the number of slots may depend on subcarrier spacing. Each slot may include a number of symbol periods (e.g., depending on the length of the CP prepended to each symbol period). In some wireless communications systems 100, a slot may further be divided into multiple mini-slots containing one or more symbols. Excluding the CP, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit of the wireless communications system 100 and may be referred to as a transmission time interval (TTI). In some cases, the TTI duration (that is, the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or various combinations thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, exterior spaces between or overlapping with geographic coverage areas 110, or the like.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to UEs 115 with service subscriptions with the network provider or may provide restricted access to UEs 115 having an association with the small cell (e.g., UEs 115 in a closed subscriber group (CSG), UEs 115 associated with users in a home or office, and the like). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB), or others) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a predefined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D)

communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between UEs 115 and base stations 105, and EHF antennas of the respective devices may be smaller and more closely spaced than UHF antennas. In some cases, this may facilitate use of antenna arrays within a device. The propagation of EHF transmissions, however, may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying certain amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

Wireless communications system 100 may support the communication of time domain SC waveforms between a UE 115 and a base station 105. For example, in some frequency bands (e.g., mmW frequency bands), the complexity of frequency domain processing (e.g., generation) of an SC waveform may increase (e.g., a sampling rate used for generating the frequency domain SC waveform may increase for wide bandwidth high frequency band communications). To reduce complexity, time domain SC waveforms may be used, which may have a lower peak to average power ratio (PAPR) leading to increased coverage area. Time domain processing of an SC waveform, however, may result in resource allocation limitations or restrictions due to the nature of the time domain processing, which may lead to inefficient use of systems resources.

According to some aspects, a UE 115 may employ a resampling technique during the time domain processing of an SC waveform and prior to insertion of a CP or GI for the time domain SC waveform. Such resampling techniques may involve up-sampling a set of mapped information bits (e.g., after constellation mapping) and prior to CP/GI insertion, which may allow for resource allocation flexibility. The resampling may be performed according to a set of resampling parameters (e.g., indicated via an SC configuration or preconfigured at the UE 115). The set of resampling parameters may include a resampling ratio (e.g., M/K), where the resampling ratio is an integer value (2, 3, 4, etc.) or fractional (e.g., time-domain rational resampler). In some cases, M is a resampling parameter or a set (or dynamic) value indicated by the base station 105 or preconfigured at the UE 115, and K is a value indicating the resource allocation for the time domain SC waveform (e.g., a set of or a number of REs or RBs of the resource allocation assigned to the UE 115).

In another example, the resampling technique may include a resampler implemented with a K-point Discrete Fourier Transform (DFT) and an M-point inverse fast Fourier transform (IFFT) such that an input of the resampler is a set of K bits and the output of the resampler is a set of M bits. In some aspects, the resampling may be dynamically configured (e.g., via an SC configuration), which may be indicated to the UE 115 from the base station 105 or may be preconfigured at the UE 115 or the base station 105. In other examples, the UE 115 or the base station 105 may dynamically select between different resampling components, parameters, or techniques (e.g., select between SC configurations incorporating different resampling components, parameters, or techniques). Each of the example SC configurations may provide a corresponding amount of RB allocation freedom and flexibility but may increase complexity.

In some cases, the base station 105 may transmit an indication of an SC configuration to the UE 115 via a configuration indication in a control message (via an RRC message, within DCI, etc.). The UE 115 may receive and decode the control message and identify the SC transmission configuration. The UE 115 and the base station 105 may implement the SC transmission configuration to receive or transmit time domain SC waveforms. Additionally or alternatively, the UE 115 may transmit a capability message to the base station 105 indicating SC transmission configurations or other parameters supported by the UE 115 (e.g., available resampling components, parameters, or techniques). For instance, the UE 115 may transmit a capability message to the base station 105 indicating a set of K values or resampling ratios (e.g., M/K) supported by the UE 115. Such techniques may provide flexibility in complexity, resources allocation, and cost, as described herein.

Figure 2:
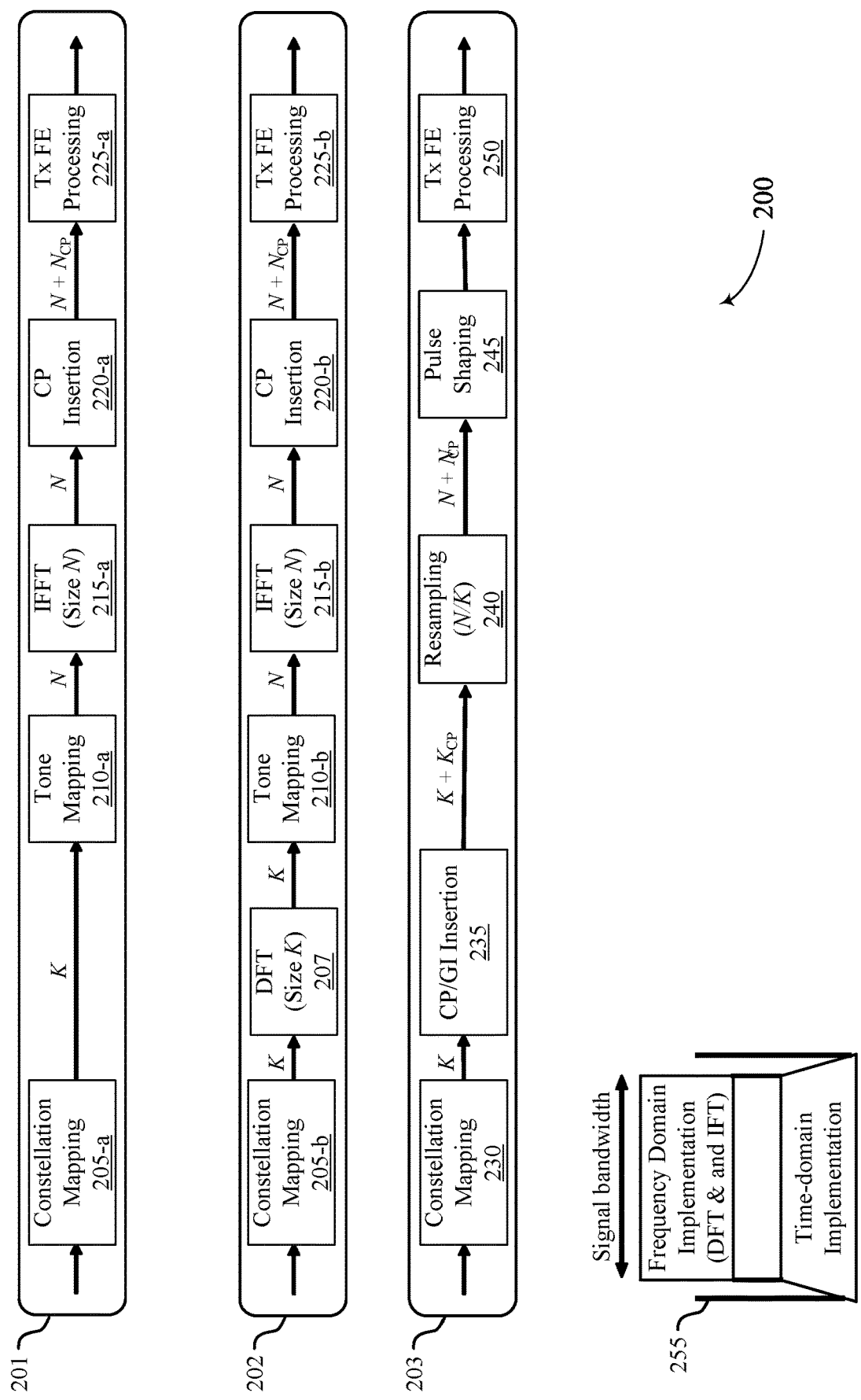
FIG. 2 illustrates example signal processing flows that support resource allocation constraint mitigation in accordance with aspects of the present disclosure.

FIG. 2 illustrates example signal processing flows 201, 202, and 203 that may implement aspects of wireless communications system 100.

Signal processing flow 201 illustrates an example signal processing flow for OFDM transmission (frequency domain implementation), and may include processes for constellation mapping 205-a, tone mapping 210-a, IFFT 215-a, CP insertion 220-a, and transmission front end (FE) processing 225-a.

According to signal processing flow 201, frequency domain samples are input and at constellation mapping 205-a, a transmitting device may perform constellation mapping that includes modulating bits for transmission according to a modulation scheme, which may output encoded bits for the OFDM waveform. At tone mapping 210-a, the transmitting device may perform tone mapping to map the encoded bits to the frequency domain (e.g., to subcarriers in the frequency domain indicated by the resource allocation). At IFFT 215-a, the transmitting device may perform an IFFT procedure in which samples are output in the time domain with a specified output sample length. At CP insertion 220-a, the transmitting device may add a CP to transmission. At transmission FE processing 225-a, a transmitter FE may perform FE processing including filtering and conversion of the samples from digital to an analog form, among other processes.

Signal processing flow 202 illustrates an example signal processing flow for an SC waveform transmission (frequency domain implementation), for example, for a DFT-S-OFDM waveform. Signal processing flow 202 may include constellation mapping 205-b, tone mapping 210-b, IFFT 215-b, CP insertion 220-b, and transmission FE processing 225-b, which may be examples of the constellation mapping 205-a, tone mapping 210-a, IFFT 215-a, CP insertion 220-a, and transmission FE processing 225-a of signal processing flow 201. Signal processing flow 202 may additionally include a DFT 207.

According to signal processing flow 202, time domain samples are input and at constellation mapping 205-b, a transmitting device may perform constellation mapping that includes modulating bits for transmission according to a modulation scheme, which may output encoded bits for the SC waveform. At DFT 207, the transmitting device may perform a DFT process that converts the encoded bits into the frequency domain. At tone mapping 210-b, the transmitting device may perform tone mapping to map the encoded bits to the frequency domain (e.g., to subcarriers in the frequency domain indicated by the resource allocation). At IFFT 215-b, the transmitting device may perform an IFFT procedure in which samples are output in the time domain with a specified output sample length. In some cases, the output of IFFT 215-b may include samples with an output sample length of N, which may be a different number than K. At CP insertion 220-b, the transmitting device may add a CP to transmission. At transmission FE processing 225-b, a transmitter FE may perform FE processing including filtering and conversion of the samples from digital to an analog form, among other processes.

In some cases, the length of input samples (e.g., a length K) to DFT 207 may be restricted (e.g., limited to certain values or certain minimum group sizes) in order to lower complexity and account for time domain processing. For example, the DFT input sample length K may be restricted to any multiple of two, three, or five. In some cases, the IFFT output may include samples with an output sample length of N, which may be a different number than K. The transmitter may append a GI or CP to the generated signal (e.g., at CP insertion 220-b) and a transmitter FE may convert the signal from a digital to an analog form (e.g., at TX FE processing).

Signal processing flow 203 illustrates a signal processing flow for SC waveform transmission (time-domain implementation), and may include processes for constellation mapping 230, CP/GI insertion 235, resampling 240, pulse shaping 245, and transmission FE processing 250.

Signal processing flow 203 may include generating SC signals using resampling and up-conversion processes (e.g., to achieve the same results as DFT 207, tone mapping 210-b, and IFFT 215-b processes included in processing flow 202). For example, according to processing flow 203, an SC transmitter of a transmitting device may add a CP or GI (e.g., in the time domain) at CP/GI insertion 235 to information for transmission and may perform resampling 240. At resampling 240, the first number of samples (e.g., K samples) may be resampled to a second number of samples (e.g., N samples), using a resampling ratio (e.g., N/K). Further, the SC transmitter may apply a resampling pulse shaping filter function at pulse shaping 245 (e.g., a sinc function), where the pulse-shaping may, in some cases, lead to some PAPR. In other cases (e.g., based on a shape of the pulse shaping filter), the SC transmitter may achieve a lower PAPR and a wider bandwidth occupation (e.g., shown at 255). Additionally or alternatively, the pulse shaping filter may be chosen such that the transmission occupies a fraction of the system bandwidth (e.g., to allow for UE multiplexing). In some cases, the up-conversion process may be implemented by an up-conversion at a receiver FE or by time domain phase ramping.

In some cases, the SC transmitter may reduce complexity by setting (e.g., limiting) the resampling ratio of N/K to a preconfigured value or a value selected from a set of values for resampling (e.g., where K is a multiple of two, three, or five). Limiting the resampling ratio may also reduce complexity by using a shorter pulse shaping filter. Additionally, the SC transmitter may move an SC signal to a given frequency (e.g., within a frequency band) by choosing a proper phase ramp, or in some cases, the SC transmitter may leave the selection of the phase ramp to a mixer.

Wireless devices may receive some SC waveforms (e.g., SC-FDM signals) using a signal reception process as described with reference to FIG. 1. Additionally or alternatively, wireless devices may receive SC signals using down-conversion, down-sampling, and equalization (e.g., time domain or frequency domain equalization) processes (e.g., to achieve the same results as FFT, tone demapping, and inverse discrete Fourier transform (IDFT) processes). Further, the SC receiver may match a pulse shaping filter used by the transmitting device (e.g., in order to undo filtering operations). In some examples, an SC receiver may implement the down-conversion process by performing a down-conversion of time domain phase ramping at a receiver FE. Additionally, the SC receiver may perform down-sampling as a part of a signal sampling or equalization process and in some cases, the SC receiver may use either a frequency domain equalization or a time domain equalization process. The SC receiver may further reduce complexity by limiting the down-sampling ratio of N/K to a value, as discussed above, which may also reduce complexity by using a shorter time domain equalizer. In some cases, the complexity of the processes performed by the SC filter may be proportional to a number of taps in a time domain equalizer.

Some types of wireless communications devices may benefit from the use of an SC waveform as compared to other waveforms (e.g., OFDM waveforms, etc.). For example, communications using an SC waveform may have a low PAPR and in some cases, may be implemented with low complexity at a transmitter and a receiver. In one example, a base station may transmit SC-FDM downlink communications (e.g., one or more downlink messages) to a UE, and the UE may implement an SC receiver in the time domain to receive the downlink communications while lowering complexity and increasing power savings. Additionally or alternatively, the UE may transmit SC-FDM uplink communications (e.g., one or more uplink messages 255) to base station, where a lower PAPR of the SC-FDM uplink signaling may increase power savings at the UE or increase cell coverage.

The time domain implementations of SC waveforms may restrict resource allocation (e.g., allocation of available frequency resources such as REs and RBs). For example, in some time domain implementations, the CP and data duration of the SC waveform in a high band (e.g., FR4) may be consistent with numerology of higher bands. In an example, for a receiving device to be able to receive multiple waveform types in a time domain implementation from different devices (e.g., receive OFDM waveforms in a time domain implementation), the receiving device may be configured for an SC waveform that aligns with the OFDM waveforms.

Any of signal processing flows 201, 202, or 203 may be modified to include resampling techniques discussed herein, which may limit the resource allocation restriction for SC waveforms.

Figure 3:
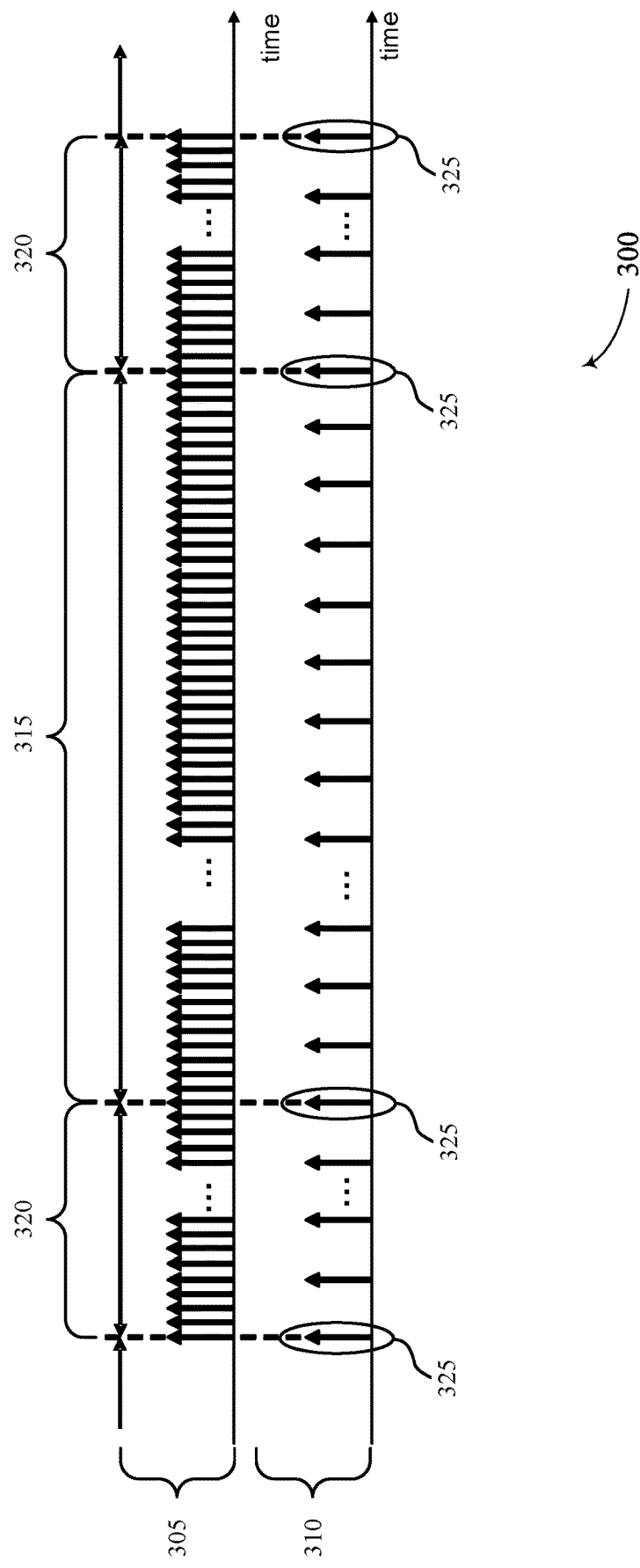
FIG. 3 illustrates an example timing diagram that supports resource allocation constraint mitigation in accordance with aspects of the present disclosure.

FIG. 3 is an example timing diagram that supports resource allocation constraint mitigation in accordance with aspects of the present disclosure. FIG. 3 illustrates time samples of an OFDM waveform (OFDM time samples 305) and time samples of an SC waveform (SC waveform time samples 310), for a case where the OFDM waveform and SC waveform coexist in the same high frequency band. According to the example illustrated in FIG. 3, data sample timing may align with all OFDM symbol boundaries (e.g., boundaries of data duration 315) and CP boundaries (e.g., boundaries of CP 320). For example, in FIG. 3, OFDM time samples 305 and SC waveform time samples 310 align at time points which correspond to the boundaries of data duration 315 and CP 320 (indicated by alignment points 325).

Aspects of signal processing flow 202 and signal processing flow 203 for SC waveform generation may be implemented to align OFDM waveforms with SC waveforms from multiple wireless devices in a wireless system that supports coexistence of multiple waveform types. For example, some values or parameters used in signal processing flow 202 or signal processing flow 203 for SC waveform generation may be selected or designed such that the generated SC waveforms align with other types of waveforms in the wireless communications system, as illustrated by FIG. 3.

In a frequency domain implementation, CP insertion may occur after IFFT. For example, referring to signal processing flow 202 (frequency domain implementation), CP insertion may occur at 220-*b*, following IFFT 215-*b*. The output by CP Insertion 220-*b* may have a number of samples equal to $N+\alpha_{CP}N$, where N is the IFFT size and $\alpha_{CP}$ is a CP ratio, which may be a standardized value or may be specified depending on other factors, such as numerology and subcarrier spacing. Possible values for $\alpha_{CP}$ in some systems (e.g., in an NR system) may share a common denominator having an integer value of 128. For example, possible values for $\alpha_{CP}$ in NR may include $$\frac{1}{4}, \frac{9}{128}, \frac{10}{128}, \frac{11}{128}, \frac{13}{128}, \frac{17}{128}, \frac{25}{128}.$$

Examples of extended CP values and normal CP values are provided below, where µ is equal to 0, 1, 2, 3, or 4 and κ is equal to 64.

$$N_u^\mu = 2048\kappa \cdot 2^{-\mu}$$

$$N_{CP,j}^\mu = \begin{cases} 512\kappa \cdot 2^{-\mu} & \text{extended cyclic prefix} \\ 144\kappa \cdot 2^{-\mu} + 16\kappa & \text{normal cyclic prefix, } l = 0 \text{ or } l = 7 \cdot 2^\mu \\ 144\kappa \cdot 2^{-\mu} & \text{normal cyclic prefix, } l \neq 0 \text{ and } l \neq 7 \cdot 2^\mu \end{cases}$$

In the time domain implementation, CP/GI may be inserted prior to resampling. For example, referring to signal processing flow 203 (time domain implementation), CP/GI insertion may occur at 235, prior to resampling 240. The output (e.g., number of samples) from CP/GI Insertion 235 may be equal to $(K+\alpha_{CP}K)$, where $\alpha_{CP}$ is a CP ratio. In the time domain implementation, K (e.g., number of REs) may be a relatively small value. At the output of resampling 240 of signal processing flow 203 (time domain implementation), the number of samples may equal $$(K + \alpha_{CP}K)\frac{N}{K},$$

where the CP/GI length, $K_{CP}$ (which is equal to $\alpha_{CP}K$), may be an integer value.

For the time domain implementation of SC waveforms to align in time with the frequency domain implementation of SC waveforms or OFDM waveforms, K may be restricted to a value equal to a multiple of 128. That is, the number of allocated REs must be a multiple of 128, where:

$12N_{RB}=128n$ ($N_{RB}$, n: integer), and $$N_{RB} = \frac{32}{3}n$$

(n: 3, 6, 9, . . . ),
where $N_{RB}$ indicates the number of RBs. That is, as one (1) RB is composed of twelve (12) REs, the number of allocated RBs, $N_{RB}$, may be restricted to a value equal to a multiple of 32. For example, $N_{RB}$ may be equal to 32, 64, 128, etc. Accordingly, RB allocation may be restricted to the values described in FIGS. 2 and 3, and a wireless device (e.g., a UE or a base station) may be unable to allocate an amount of RBs that is less than a multiple of 32. According to some aspects, however, resampling at a transmitting device may be performed to allow for increased flexibility in the resource allocation for time domain SC waveforms such that the transmitting device is not subject to the above restrictions.

Figure 4:
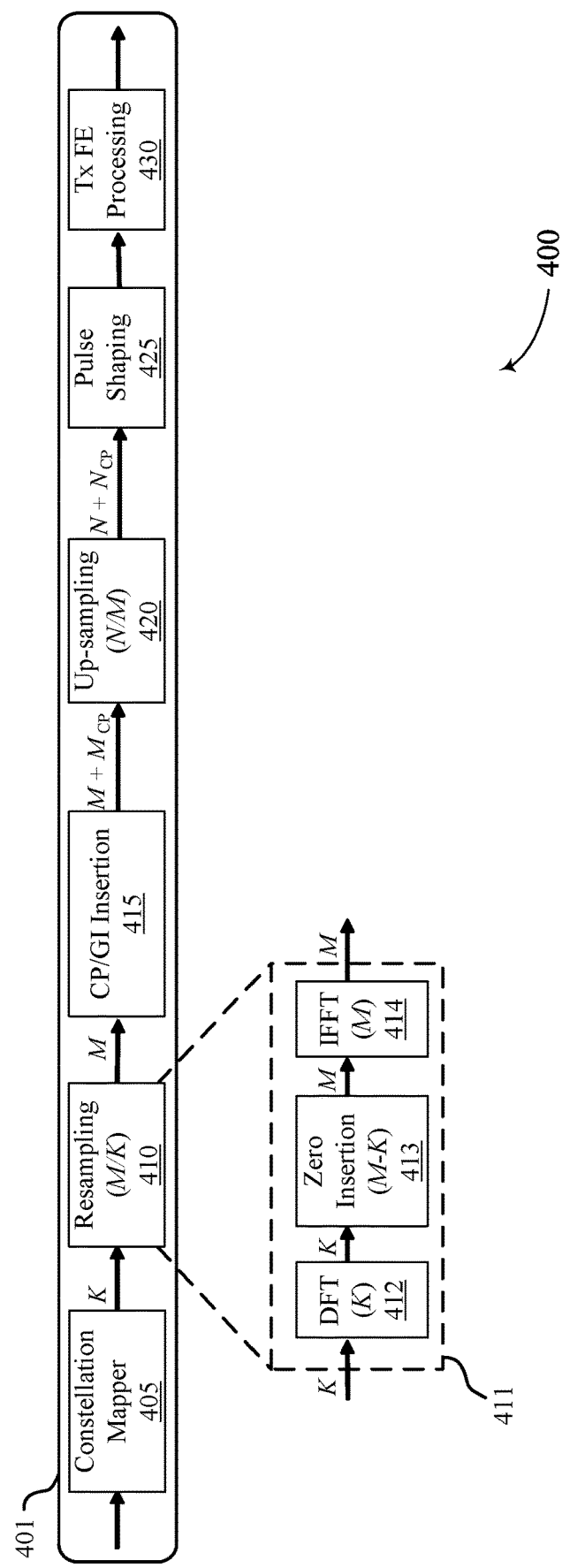
FIG. 4 illustrates an example signal processing flow that supports resource allocation constraint mitigation in accordance with aspects of the present disclosure.

FIG. 4 illustrates an example of a signal processing flow 401 that supports resource allocation constraint mitigation in accordance with aspects of the present disclosure. In FIG. 4, signal processing flow 401 is an example processing flow for SC waveform transmission (time-domain implementation) which may employ an SC configuration with an additional resampling 410 for adjusting the number of REs allocated for an SC transmission. Signal processing flow 401 may include processes similar to those included in signal processing flow 203 of FIG. 2. For example, signal processing flow 401 may include constellation mapping 405, CP/GI insertion 415, resampling 420, pulse shaping 425, and transmission FE processing 430.

Time domain samples are input and at constellation mapping 405, a transmitting device may perform constellation mapping that includes modulating bits for transmission according to a modulation scheme, which may output encoded bits for the SC waveform.

At resampling 410, the transmitting device may perform resampling on the modulated information, as discussed herein. In some cases, resampling 410 may include performing a resampling according to a given ratio (e.g., M/K). The resampling 410 may performed according to one or more resampling parameters. In one example, the transmitting device may perform resampling 410 according to a given ratio (e.g., M/K), where the given ratio is an integer value (2, 3, 4, 7, 13, etc.).

In an example, ratio M/K=2, which may allow for a resource allocation such that REs may be multiples of 64, and RBs may be multiples of 16. In another example, M/K=4, which may allow for a resource allocation such that REs may be multiples of 32, and RBs may be multiples of 8. Accordingly, increasing the ratio (M/K) may mitigate or reduce resource allocation restrictions or limitations.

In another example, the transmitting device may perform resampling 410 implemented with a K-point DFT 412 and an M-point IFFT 414. For instance, the transmitting device may utilize such resampling techniques in cases where the transmitting device is already utilizing an M-pt IFFT (e.g., where M=128), and a further increase in complexity may be less of a consideration. In this case, the resampling ratio (e.g., M/K, where M is adjustable) may be a relatively large integer value, and may support a relatively small K value. This flexibility may allow for a resource allocation of a relatively small number of RBs (one, two, three, etc.) such that the restriction or limitation on the resource allocation for the SC waveform is reduced or eliminated.

In another example, the transmitting device may perform resampling at 410 according to a given ratio (e.g., M/K), where the given ratio is fractional (e.g., time-domain rational resampling). In such cases, this may provide more freedom for resource allocations, but may increase complexity at the transmitting device.

After resampling 410, the transmitting device may perform CP/GI insertion 415 to append or add a CP or GI to the SC waveform. At resampling 420, the transmitting device may perform resampling on the modulated information according to a given ratio (e.g., N/M), which may be different than the ratio used for resampling at 410. At resampling 420, N may be a relatively high value (e.g., 2048 or 4096).

At pulse shaping 425, the transmitting device may perform pulse shaping on the modulated, resampled information. In some examples (e.g., based on a shape of the pulse shaping filter), the transmitting device may achieve a lower PAPR and a wider bandwidth occupation. Additionally or alternatively, the pulse shaping filter may be chosen such that the transmission occupies a fraction of the system bandwidth (e.g., to allow for UE multiplexing).

At transmission FE processing 430, the transmitting device may perform transmission FE processing which may include converting the information to be transmitted from a digital signal to an analog signal, among other processes.

Figure 5A:
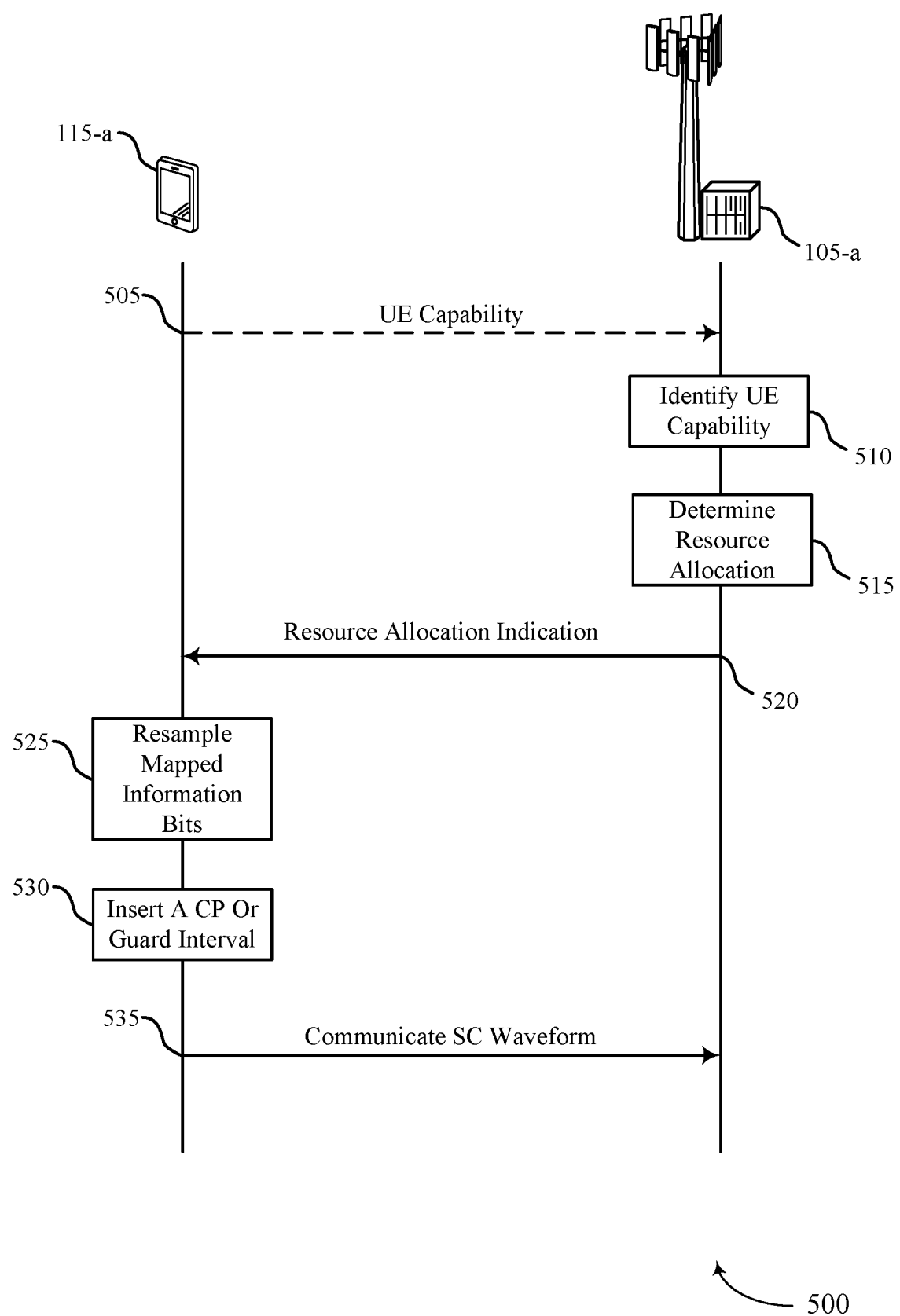
FIGS. 5A and 5B illustrate examples of process flows that support resource allocation constraint mitigation in accordance with aspects of the present disclosure.

FIG. 5A illustrates an example of a process flow 500 that supports resource allocation constraint mitigation in accordance with aspects of the present disclosure. In some examples, process flow 500 may implement aspects of wireless communications system 100. The process flow 500 may include UE 115-*a* and base station 105-*a*, which may be respective examples of a UE 115 and a base station 105 as described herein.

In some cases, UE 115-*a* may identify a capability of UE 115-*a* for communicating a time domain SC waveform, the capability indicating a limitation on a number of resources for communication of the time domain SC waveform. The capability may indicate different SC transmission configurations available for UE 115-*a*. For example, the capability may include a resampling ratio for the time domain SC waveform supported by UE 115-*a*. The resampling ratio may indicate a ratio between a set of resampled information bits in a time domain and the number of resources supported by UE 115-*a*. In some cases, the resampling ratio may be an integer value or fractional. In some cases, the capability may include available resampling components or resampling configurations available at UE 115-*a*. Alternatively or additionally, the capability may indicate types of waveforms (e.g., OFDM, frequency-domain SC waveform, or time-domain SC-waveform) supported by the UE 115-*a*. At 505, UE 115-*a* may transmit, to base station 105-*a*, a UE capability message including an indication of the capability of UE 115-*a*.

At 510, base station 105-*a* may identify the capability of UE 115-*a* for communication of the time domain SC waveform. The capability may indicate a limitation on a number of resources allocated for communicating the time domain SC waveform with base station 105-*a*. In some cases, base station 105-*a* may identify the capability based on receiving the indication of the capability at 505. Or, in some cases, base station 105-*a* may identify the capability based on the capability being pre-configured. For example, the capability may be stored in memory at base station 105-*a* or another network device.

At 515, base station 105-*a* may determine a resource allocation for communicating the time domain SC waveform based on the limitation on the number of resources imposed by UE 115-*a*. In some cases, the resource allocation may be determined based on the resampling ratio indicated by the UE capability. At 520, base station 105-*a* may indicate, to UE 115-*a*, the resource allocation for communicating the time domain SC waveform. UE 115-*a* may receive the indication of the resource allocation. In some aspects, a wireless cell of the base station 105-*a* may support the time domain SC waveform and a second waveform different from the time domain SC waveform. In some example aspects, a data sample timing of the time domain SC waveform may be aligned in time with a symbol boundary of a communication of the second waveform by at least one other transmitting device (e.g., at least one other UE 115).

At 525, UE 115-*a* may resample a set of mapped information bits for the time domain SC waveform based on the resampling ratio. In some cases, resampling the set of mapped information bits may include transforming the set of mapped information bits into a frequency domain representation based on the number of resources. The resampling may include inserting a set of zero values into the transformed set of mapped information bits based on the resampling ratio. UE 115-*a* may transform the frequency domain representation into a time domain representation of the time domain SC waveform based on the resampling ratio.

After resampling the set of mapped information bits, UE 115-*a* may insert a CP or a GI into the resampled set of mapped information bits at 530. At 535, UE 115-*a* may communicate the time domain SC waveform with base station 105-*a* in accordance with the resource allocation. For example, UE 115-*a* may transmit the time domain SC waveform to base station 105-*a* at 535.

As shown, process flow 500 illustrates an uplink transmission of a time domain SC waveform generated by UE 115-*a*. It is noted, however, that the process flow 500 may also be applicable for downlink transmission of a time domain SC waveform (e.g., an SC waveform generated by base station 105-*a*) and transmitted to UE 115-*a*. For instance, techniques such as resampling and inserting a CP or GI to generate an SC waveform may be performed by base station 105-*a* to transmit an SC waveform to the UE 115-*a*.

Figure 5B:
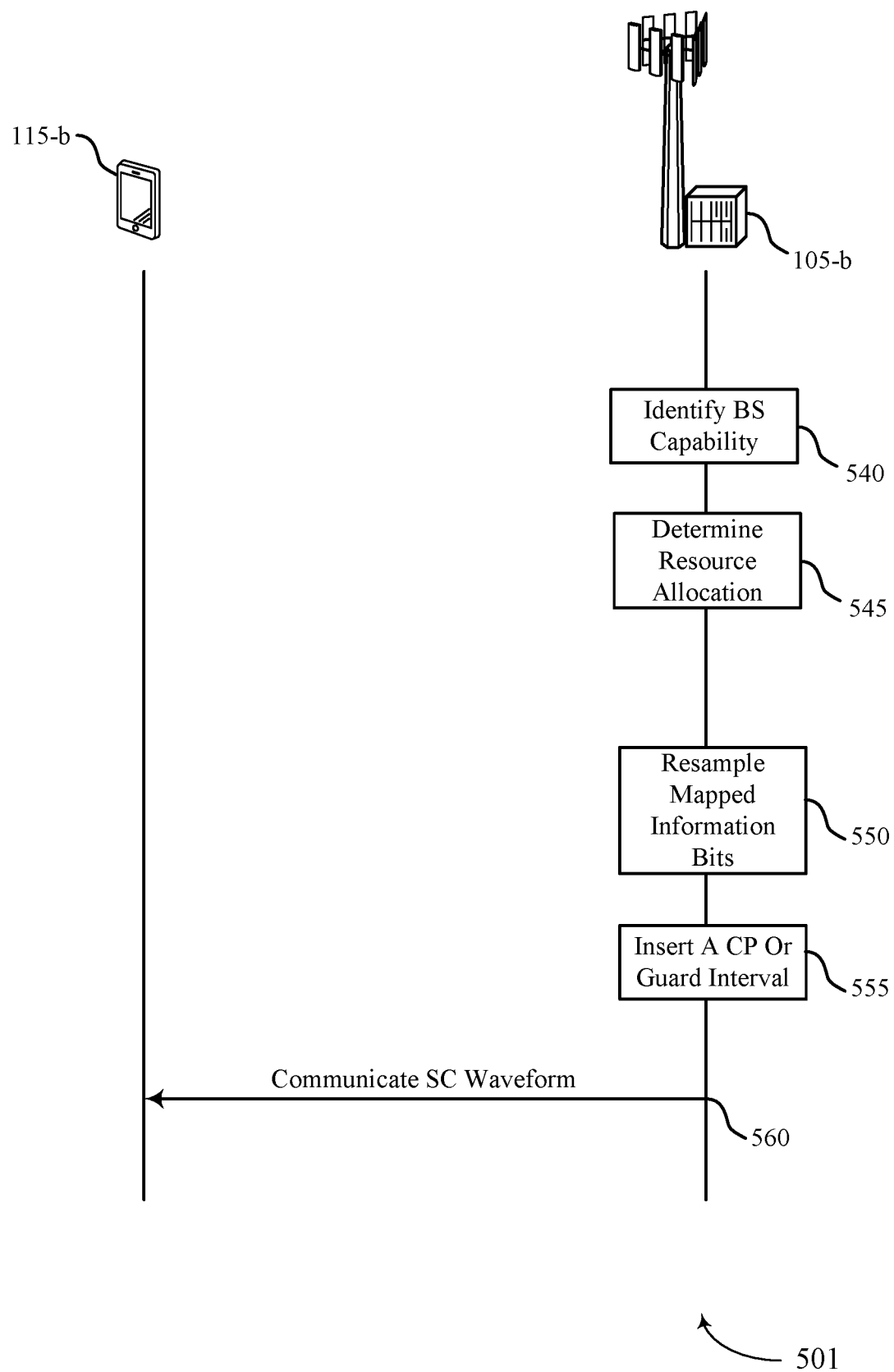

FIG. 5B illustrates an example of a process flow 501 that supports resource allocation constraint mitigation in accordance with aspects of the present disclosure. In some examples, process flow 501 may implement aspects of wireless communications system 100. The process flow 501 may include UE 115-*b* and base station 105-*b*, which may be respective examples of a UE 115 and a base station 105 as described herein.

In some cases, at 540, base station 105-*b* may identify a capability of base station 105-*b* for communicating a time domain SC waveform, the capability indicating a limitation on a number of resources for communication of the time domain SC waveform. The capability may indicate different SC transmission configurations available for base station 105-*b*. For example, the capability may include a resampling ratio for the time domain SC waveform supported by base station 105-*b*. The resampling ratio may indicate a ratio between a set of resampled information bits in a time domain and the number of resources supported by base station 105-*b*. In some cases, the resampling ratio may be an integer value or fractional. In some cases, the capability may include available resampling components or resampling configurations available at base station 105-*b*. Alternatively or additionally, the capability may indicate types of waveforms (e.g., OFDM, frequency-domain SC waveform, or time-domain SC-waveform) supported by the base station 105-*b*.

In some cases, base station 105-*b* may identify the capability based on the capability being pre-configured. For example, the capability may be stored in memory at base station 105-*b* or another network device. In an example, a wireless cell of the base station 105-*b* may support the time domain SC waveform and a second waveform different from the time domain SC waveform. In some example aspects, a data sample timing of the time domain SC waveform may be aligned in time with a symbol boundary of a communication of the second waveform by at least one other transmitting device (e.g., at least one other UE 115 operating in the wireless cell of base station 105-*b*). For example, UE 115-*b* and another UE 115 may be operating in the wireless cell of the base station 105-*b*, and the data sample timing of the time domain SC waveform may be aligned in time with a symbol boundary of a communication of the second waveform by the other UE 115.

At 545, base station 105-*b* may determine a resource allocation for communicating the time domain SC waveform based on a limitation on the number of resources imposed by base station 105-*a*. In some cases, the resource allocation may be determined based on the resampling ratio indicated by the base station 105-*b* capability.

At 550, base station 105-*b* may resample a set of mapped information bits for the time domain SC waveform based on the resampling ratio. In some cases, resampling the set of mapped information bits may include transforming the set of mapped information bits into a frequency domain representation based on the number of resources. The resampling may include inserting a set of zero values into the transformed set of mapped information bits based on the resampling ratio. Base station 105-*b* may transform the frequency domain representation into a time domain representation of the time domain SC waveform based on the resampling ratio.

After resampling the set of mapped information bits, base station 105-*b* may insert a CP or a GI into the resampled set of mapped information bits at 555. At 560, base station 105-*b* may communicate the time domain SC waveform with UE 115-*b* in accordance with the resource allocation. For example, base station 105-*b* may transmit the time domain SC waveform to UE 115-*b* at 560.

As shown, process flow 501 illustrates a downlink transmission of a time domain SC waveform generated by base station 105-*b*. It is noted, however, that the process flow 501 may also be applicable for uplink transmission of a time domain SC waveform (e.g., an SC waveform generated by UE 115-*b*) and transmitted to base station 105-*b*. For instance, techniques such as resampling and inserting a CP or GI to generate an SC waveform may be performed by UE 115-*b* to transmit an SC waveform to the base station 105-*b*.

Figure 6:
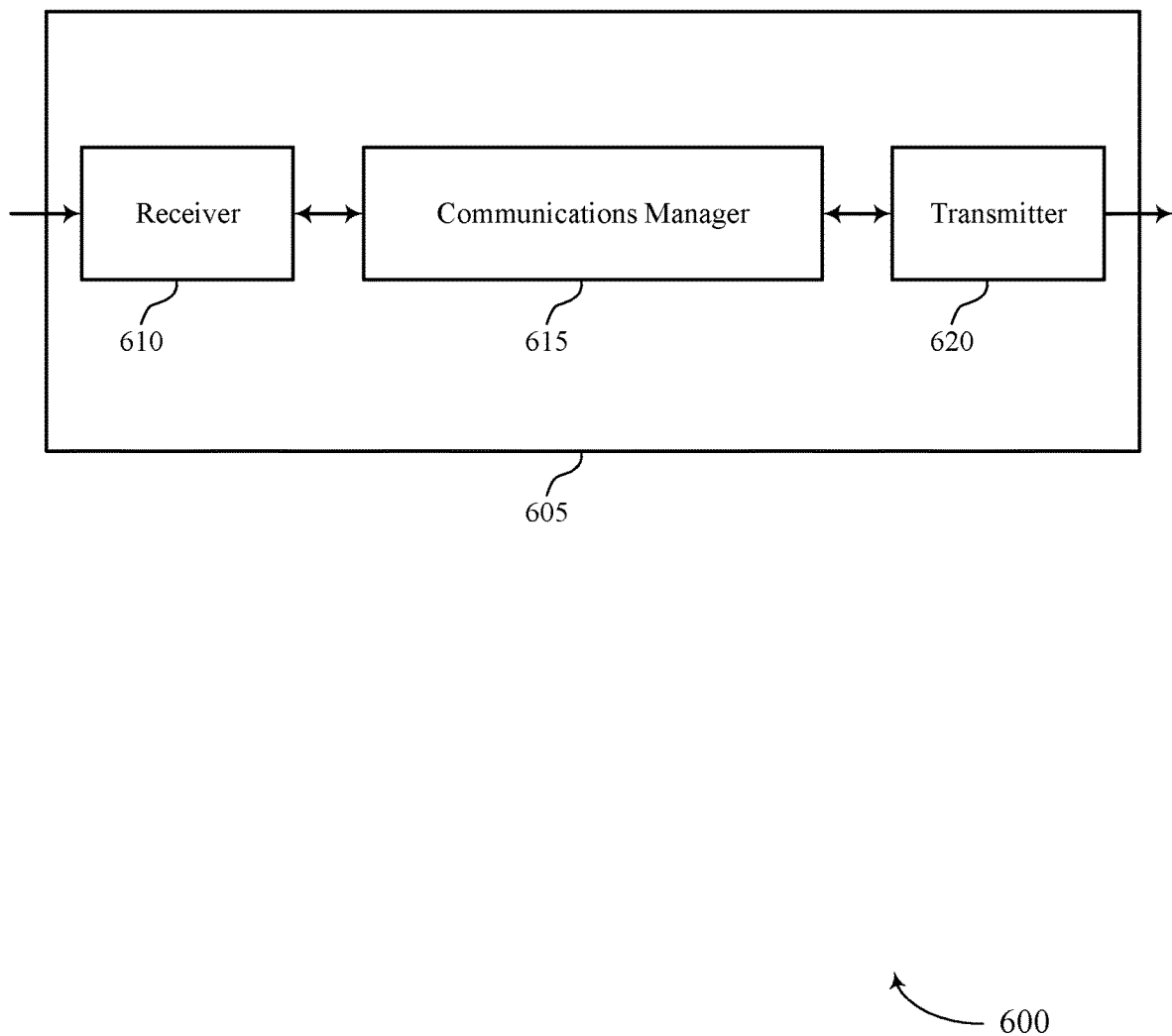
FIGS. 6 and 7 show block diagrams of devices that support resource allocation constraint mitigation in accordance with aspects of the present disclosure.

FIG. 6 shows a block diagram 600 of a device 605 that supports resource allocation constraint mitigation in accordance with aspects of the present disclosure. The device 605 may be an example of aspects of a transmitting device as described herein. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to resource allocation constraint mitigation, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may identify a resource allocation indicating a number of resources allocated under a limitation on the number of resources for communication of a time domain SC waveform with the receiving device and communicate the time domain SC waveform with the receiving device in accordance with the resource allocation. In some aspects, the transmitting device may be operating in a wireless cell of the receiving device that may support the time domain SC waveform and a second waveform different from the time domain SC waveform. In some example aspects, a data sample timing of the time domain SC waveform may be aligned in time with a symbol boundary of a communication of the second waveform by at least one other transmitting device (e.g., at least one other UE 115). The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

In some examples, the communications manager 615 may be implemented as an integrated circuit or chipset for a mobile device modem, and the receiver 610 and transmitter 620 may be implemented as analog components (e.g., amplifiers, filters, antennas, etc.) coupled with the mobile device modem to enable wireless transmission and reception over one or more bands.

The actions performed by the communications manager 615 as described herein may be implemented to realize one or more potential advantages. One implementation may allow a transmitting device (e.g., UE 115, base station 105) to mitigate or limit the restrictions on resource allocation for a time domain SC waveform. For example, a transmitting device (e.g., UE 115, base station 105) may utilize a time domain SC waveform to reduce complexity and increase PAPR (e.g., when operating in higher frequency bands such as mmW frequencies). In such cases, the transmitting device (e.g., UE 115, base station 105) may perform resampling prior to CP/GI insertion based on a capability of the transmitting device (e.g., UE 115, base station 105). Due to the resampling, resource allocations for the transmitting device (e.g., UE 115, base station 105) may be more flexible and may result in improved spectral efficiency and efficient use of system resources. Utilizing the techniques herein, the transmitting device (e.g., UE 115, base station 105) may also save power and increase performance due to the lower complexity SC waveform generation while maintaining alignment with other waveform types (e.g., from other UEs) in order to coexist in a wireless communications system with UEs supporting other waveforms (e.g., OFDM waveforms).

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
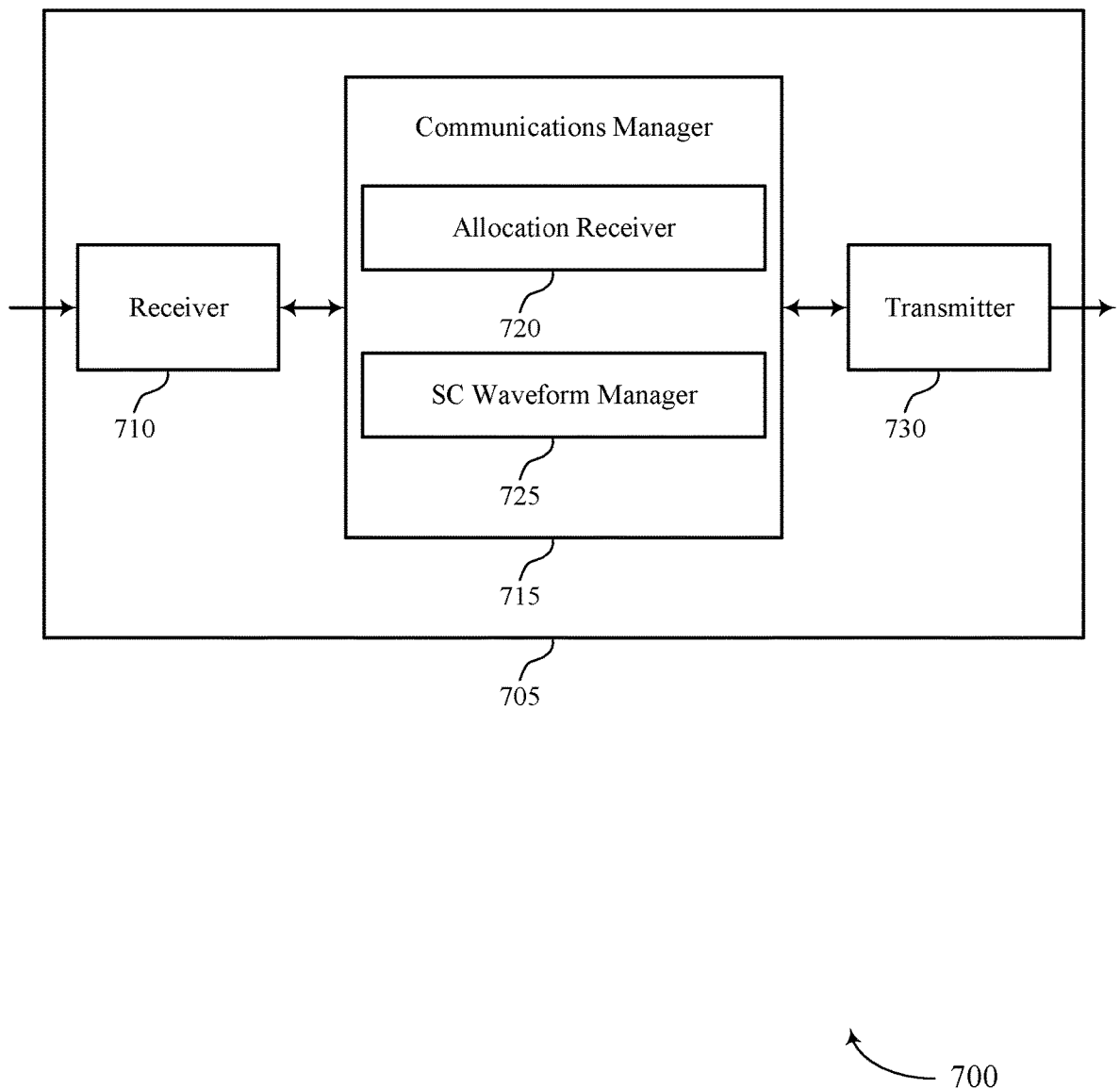

FIG. 7 shows a block diagram 700 of a device 705 that supports resource allocation constraint mitigation in accordance with aspects of the present disclosure. The device 705 may be an example of aspects of a device 605, or a UE 115 as described herein. The device 705 may include a receiver 710, a communications manager 715, and a transmitter 730. The device 705 may also include a processor. Each of these components may be in communication with one another (e.g., via one or more buses).

The receiver 710 may receive information such as packets, user data, or control information associated with various information channels (e.g., control channels, data channels, and information related to resource allocation constraint mitigation, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include an allocation receiver 720 and a SC waveform manager 725. The communications manager 715 may be an example of aspects of the communications manager 910 described herein.

The allocation receiver 720 may identify a resource allocation indicating a number of resources allocated under a limitation on the number of resources for communication of a time domain SC waveform with a receiving device. In some aspects, the transmitting device may be operating in a wireless cell of the receiving device that may support the time domain SC waveform and a second waveform different from the time domain SC waveform.

The SC waveform manager 725 may communicate the time domain SC waveform with the receiving device in accordance with the resource allocation. In some example aspects, a data sample timing of the time domain SC waveform may be aligned in time with a symbol boundary of a communication of the second waveform by at least one other transmitting device (e.g., at least one other UE 115).

The transmitter 730 may transmit signals generated by other components of the device 705. In some examples, the transmitter 730 may be collocated with a receiver 710 in a transceiver module. For example, the transmitter 730 may be an example of aspects of the transceiver 920 described with reference to FIG. 9. The transmitter 730 may utilize a single antenna or a set of antennas.

Figure 8:
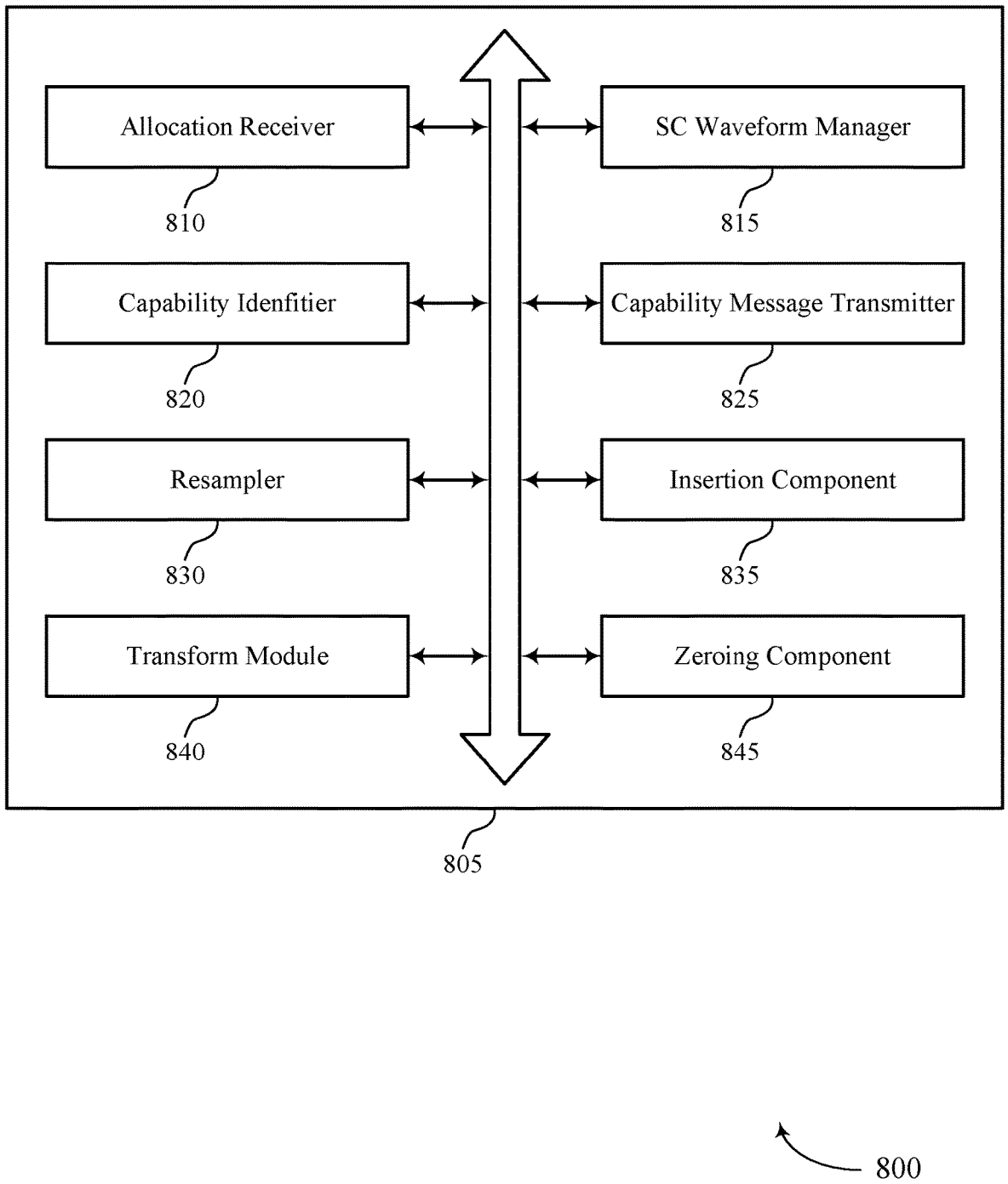
FIG. 8 shows a block diagram of a communications manager that supports resource allocation constraint mitigation in accordance with aspects of the present disclosure.

FIG. 8 shows a block diagram 800 of a communications manager 805 that supports resource allocation constraint mitigation in accordance with aspects of the present disclosure. The communications manager 805 may be an example of aspects of a communications manager 615, a communications manager 715, or a communications manager 910 described herein. The communications manager 805 may include an allocation receiver 810, a SC waveform manager 815, a capability identifier 820, a capability message transmitter 825, a resampler 830, an insertion component 835, a transform module 840, and a zeroing component 845. Each of these modules may communicate, directly or indirectly, with one another (e.g., via one or more buses).

The allocation receiver 810 may identify a resource allocation indicating a number of resources allocated under a limitation on the number of resources for communication of a time domain SC waveform with a receiving device. In some aspects, the transmitting device may be operating in a wireless cell of the receiving device that may support the time domain SC waveform and a second waveform different from the time domain SC waveform. In some cases, the limitation on the number of resources is preconfigured at the transmitting device and the receiving device. In some cases, the transmitting device may include a UE, the at least one other transmitting device may include at least one second UE, and the receiving device may include a base station. In some cases, the UE and the at least one second UE are part of a group of UEs supported by the base station. In some cases, at least one UE of the group of UEs supports OFDM waveform communication with the base station, and the communication of the second waveform by the at least one other transmitting device includes an OFDM waveform communication by the at least one second UE. In some cases, the number of resources corresponds to a number of REs, a number of RBs, or any combination thereof.

The SC waveform manager 815 may communicate the time domain SC waveform with the receiving device in accordance with the resource allocation. In some example aspects, a data sample timing of the time domain SC waveform may be aligned in time with a symbol boundary of a communication of the second waveform by at least one other transmitting device (e.g., at least one other UE 115). In some examples, the SC waveform manager 815 may receive or transmit the time domain SC waveform based on the resampling ratio. In some cases, the data sample timing of the time domain SC waveform is aligned in time with an OFDM symbol boundary of the OFDM waveform communication of the at least one second UE.

The capability identifier 820 may identify a capability of the transmitting device for communicating the time domain SC waveform, the capability indicating the limitation on the number of resources for communication of the time domain SC waveform. In some cases, the resampling ratio indicates a ratio between a set of resampled information bits in a time domain and a number of resources supported by the transmitting device. In some aspects, the resampling ratio is an integer value. In some instances, the resampling ratio is fractional.

In an example in which the transmitting device includes a UE and the receiving device includes a base station, the capability message transmitter 825 may transmit, to the base station, a UE capability message including an indication of the capability of the UE.

In some examples, the transmitting device may include a base station and the receiving device may include a UE.

The resampler 830 may resample a set of mapped information bits for the time domain SC waveform based on the resampling ratio.

The insertion component 835 may insert a CP or a GI into the resampled set of mapped information bits after the resampling.

The transform module 840 may transform the set of mapped information bits into a frequency domain representation based on the number of resources. In some examples, the transform module 840 may transform the frequency domain representation into a time domain representation of the time domain SC waveform based on the resampling ratio.

The zeroing component 845 may insert a set of zero values into the transformed set of mapped information bits based on the resampling ratio.

Figure 9:
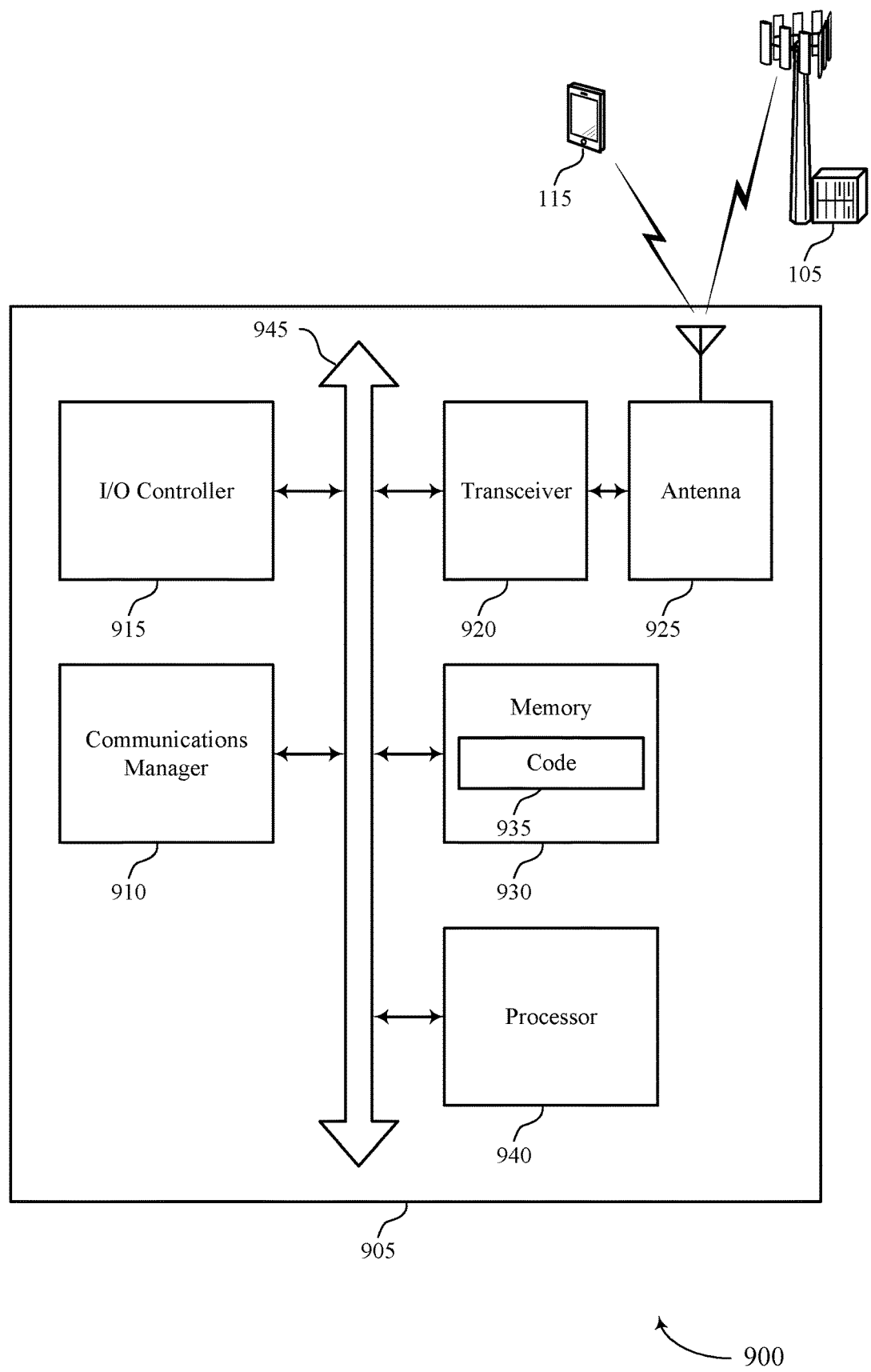
FIG. 9 shows a diagram of a system including a device that supports resource allocation constraint mitigation in accordance with aspects of the present disclosure.

FIG. 9 shows a diagram of a system 900 including a device 905 that supports resource allocation constraint mitigation in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may identify a resource allocation indicating a number of resources allocated under a limitation on the number of resources for communication of a time domain SC waveform with a receiving device and communicate the time domain SC waveform with the receiving device in accordance with the resource allocation. In some aspects, a wireless cell of the receiving device may support the time domain SC waveform and a second waveform different from the time domain SC waveform. In some example aspects, a data sample timing of the time domain SC waveform may be aligned in time with a symbol boundary of a communication of the second waveform by at least one other transmitting device (e.g., at least one other UE 115).

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the device 905 may include a single antenna 925, or the device 905 may have more than one antenna 925, which may be capable of concurrently transmitting or receiving multiple wireless transmissions.

The memory 930 may include random access memory (RAM) and read only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting resource allocation constraint mitigation).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

By limiting the restrictions on resource allocation for time domain SC waveforms, a processor of a UE 115 (e.g., controlling the receiver 610, the transmitter 620, or the transceiver 920) may be used to reduce complexity (e.g., by performing fewer calculations) when generating time domain SC waveforms. The reduction in complexity may also lead to increased battery life and lower power consumption at the UE 115. The processor of the UE 115 may be configured to perform resampling prior to CP/GI insertion during time domain processing of an SC waveform which may allow for flexible resource allocation and the ability for the UE 115 to better use available resources, which may result in a fewer number of transmissions, which may lead to increased performance and reduced utilization of processing power.

Figure 10:
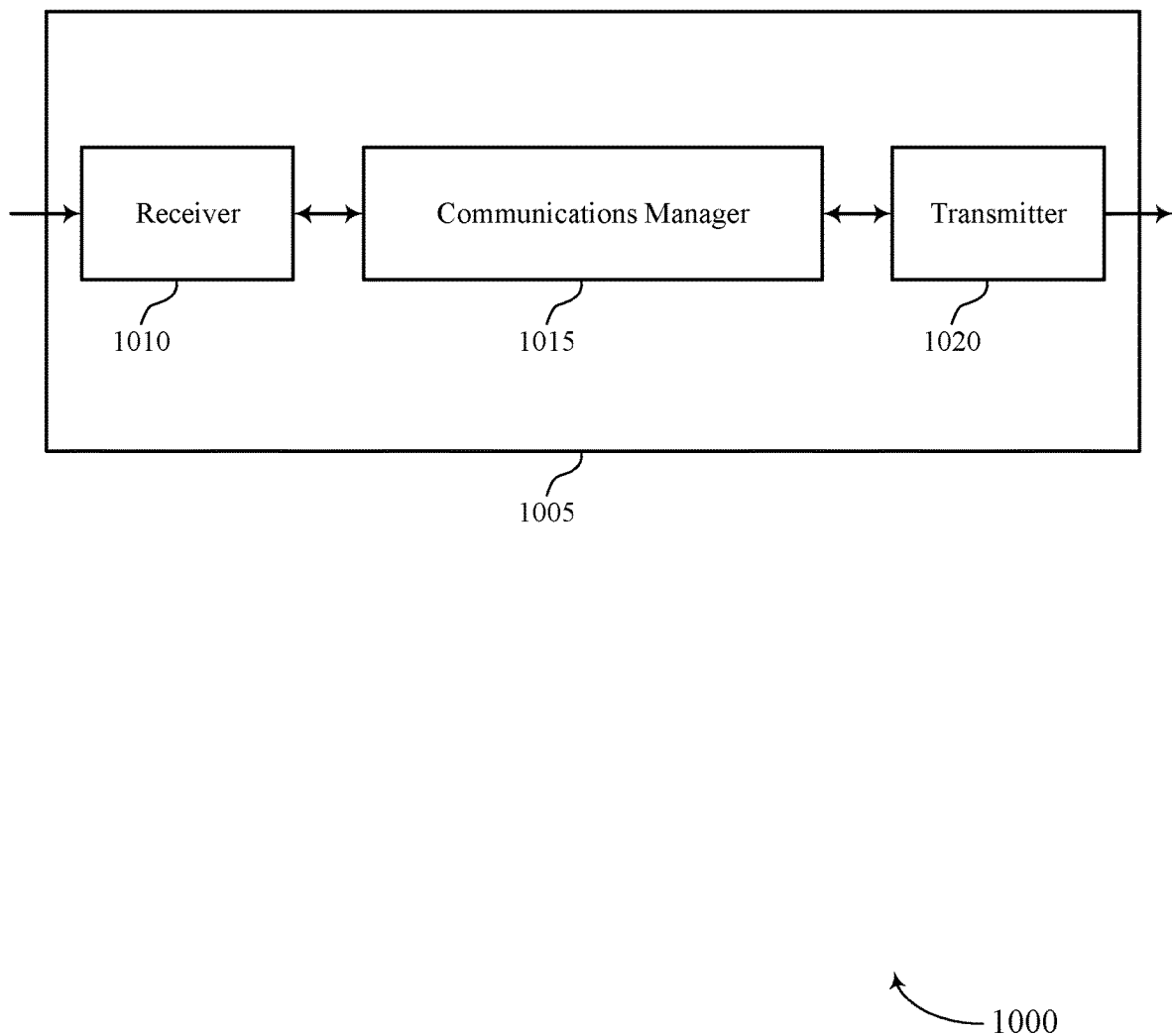
FIGS. 10 and 11 show block diagrams of devices that support resource allocation constraint mitigation in accordance with aspects of the present disclosure.

FIG. 10 shows a block diagram 1000 of a device 1005 that supports resource allocation constraint mitigation in accordance with aspects of the present disclosure. The device 1005 may be an example of aspects of a receiving device as described herein. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to resource allocation constraint mitigation, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may identify a capability of a transmitting device for communication of a time domain SC waveform with a receiving device, the capability indicating a limitation on a number of resources allocated for communicating the time domain SC waveform with the receiving device, determine a resource allocation for communicating the time domain SC waveform based on the limitation on the number of resources imposed by the transmitting device, and indicate, to the transmitting device, the resource allocation for communicating the time domain SC waveform. In some aspects, a wireless cell of the receiving device may support the time domain SC waveform and a second waveform different from the time domain SC waveform. In some example aspects, a data sample timing of the time domain SC waveform may be aligned in time with a symbol boundary of a communication of the second waveform by at least one other transmitting device. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
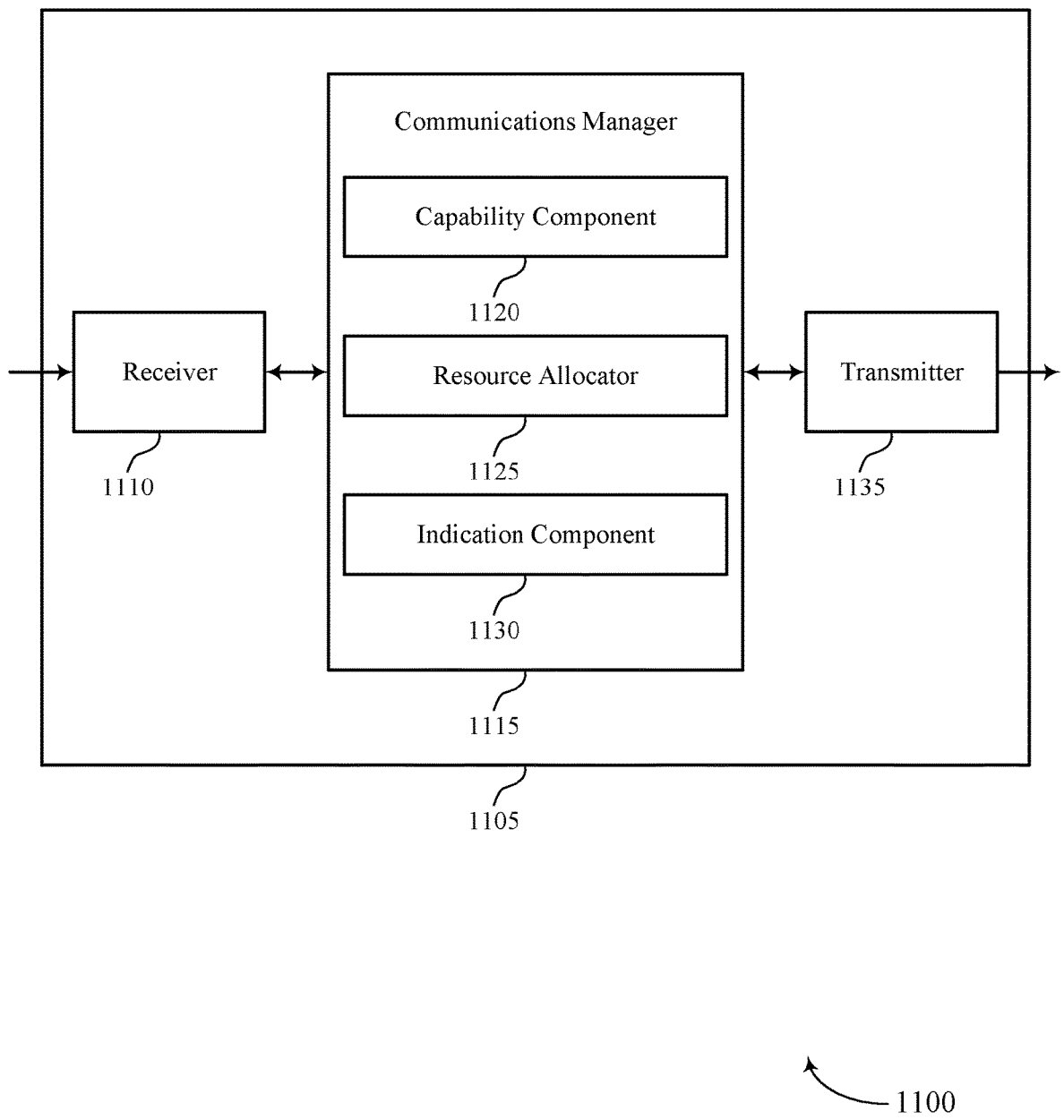

FIG. 11 shows a block diagram 1100 of a device 1105 that supports resource allocation constraint mitigation in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to resource allocation constraint mitigation, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a capability component 1120, a resource allocator 1125, and an indication component 1130. The communications manager 1115 may be an example of aspects of the communications manager 1310 described herein.

The capability component 1120 may identify a capability of a transmitting device for communication of a time domain SC waveform with a receiving device, the capability indicating a limitation on a number of resources allocated for communicating the time domain SC waveform with the receiving device. In some aspects, a wireless cell of the receiving device may support the time domain SC waveform and a second waveform different from the time domain SC waveform.

The resource allocator 1125 may determine a resource allocation for communicating the time domain SC waveform based on the limitation on the number of resources imposed by the transmitting device. In some example aspects, a data sample timing of the time domain SC waveform may be aligned in time with a symbol boundary of a communication of the second waveform by at least one other transmitting device.

The indication component 1130 may indicate, to the transmitting device, the resource allocation for communicating the time domain SC waveform.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
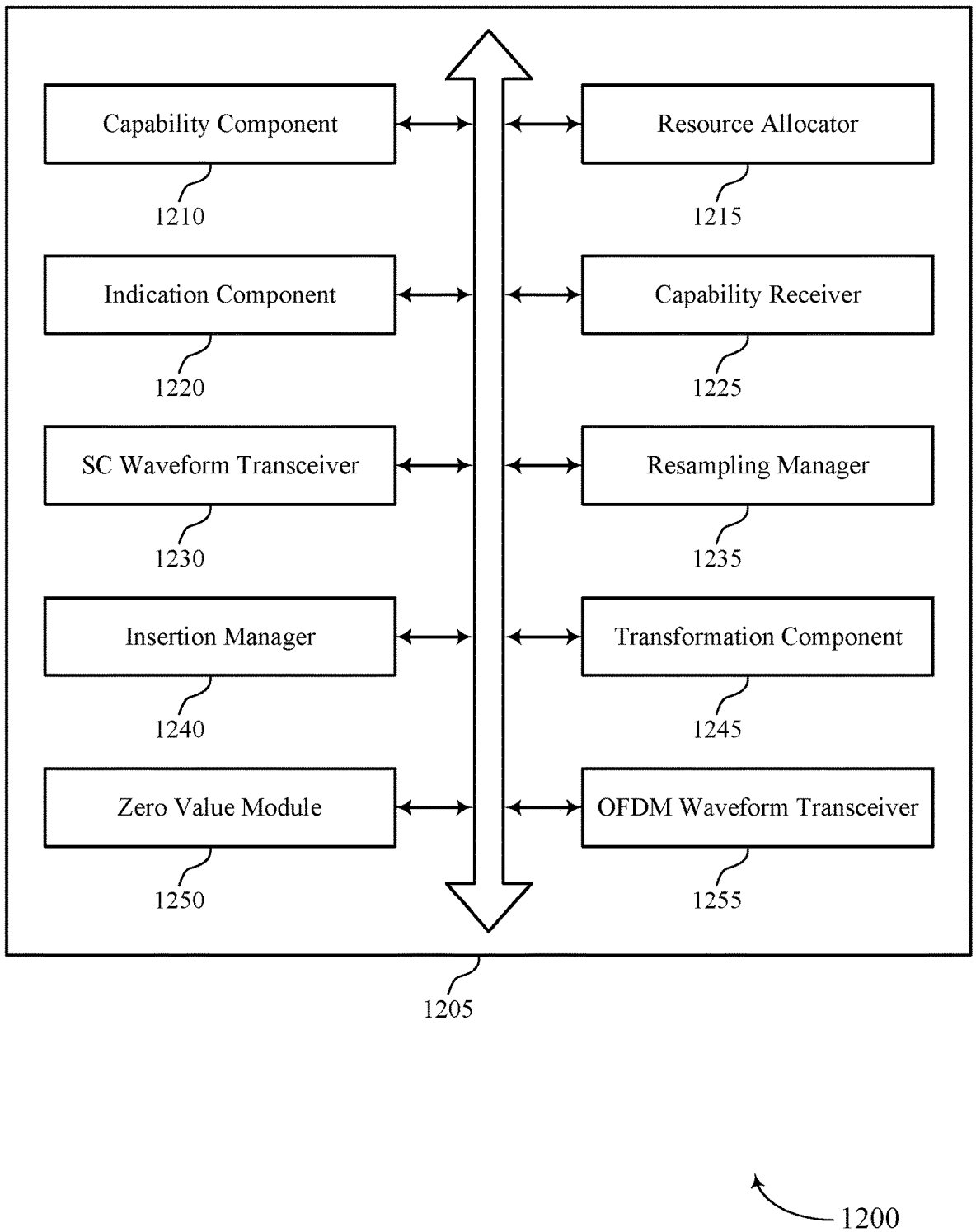
FIG. 12 shows a block diagram of a communications manager that supports resource allocation constraint mitigation in accordance with aspects of the present disclosure.

FIG. 12 shows a block diagram 1200 of a communications manager 1205 that supports resource allocation constraint mitigation in accordance with aspects of the present disclosure. The communications manager 1205 may be an example of aspects of a communications manager 1015, a communications manager 1115, or a communications manager 1310 described herein. The communications manager 1205 may include a capability component 1210, a resource allocator 1215, an indication component 1220, a capability receiver 1225, a SC waveform transceiver 1230, a resampling manager 1235, an insertion manager 1240, a transformation component 1245, a zero value module 1250, and an OFDM waveform transceiver 1255. Each of these modules may communicate, directly or indirectly, with one another (e.g., via one or more buses).

The capability component 1210 may identify a capability of a transmitting device for communication of a time domain SC waveform with the receiving device, the capability indicating a limitation on a number of resources allocated for communicating the time domain SC waveform with the receiving device. In some aspects, a wireless cell of the receiving device may support the time domain SC waveform and a second waveform different from the time domain SC waveform. In some cases, the limitation on the number of is preconfigured at the transmitting device and the receiving device. In some examples, the resampling ratio is an integer value. In some aspects, the resampling ratio is fractional. In some instances, the receiving device may include a base station, the transmitting device may include a UE, the at least one other transmitting device may include at least one second UE, and the UE and the at least one second UE are part of a group of UEs supported by the base station. In some cases, the at least one second UE of the group of UEs supports OFDM waveform communications with the base station. In some cases, the communication of the second waveform by the at least one other transmitting device may include an OFDM waveform communication by the at least one second UE. In some examples, the number of resources corresponds to a number of REs, a number of RBs, or any combination thereof.

The resource allocator 1215 may determine a resource allocation for communicating the time domain SC waveform based on the limitation on the number of resources imposed by the transmitting device. In some examples, the resource allocator 1215 may determine the resource allocation based on the resampling ratio.

The indication component 1220 may indicate, to the transmitting device, the resource allocation for communicating the time domain SC waveform. In some example aspects, a data sample timing of the time domain SC waveform may be aligned in time with a symbol boundary of a communication of the second waveform by at least one other transmitting device.

In an example in which the receiving device includes a base station and the transmitting device includes a UE, the capability receiver 1225 may receive a UE capability message from the UE, the UE capability message including an indication of the capability of the UE.

The SC waveform transceiver 1230 may receive or transmit the time domain SC waveform according to the resource allocation based on the resampling ratio.

The resampling manager 1235 may resample a set of mapped information bits for the time domain SC waveform based on the resampling ratio.

The insertion manager 1240 may insert a CP or a GI into the resampled set of mapped information bits after the resampling.

The transformation component 1245 may transform the set of mapped information bits into a frequency domain representation based on the number of resources. In some examples, the transformation component 1245 may transform the frequency domain representation into a time domain representation of the time domain SC waveform based on the resampling ratio.

The zero value module 1250 may insert a set of zero values into the transformed set of mapped information bits based on the resampling ratio.

The OFDM waveform transceiver 1255 may communicate an OFDM waveform with the at least one UE, where a data sample timing of the time domain SC waveform is aligned in time with an OFDM symbol boundary of the OFDM waveform.

Figure 13:
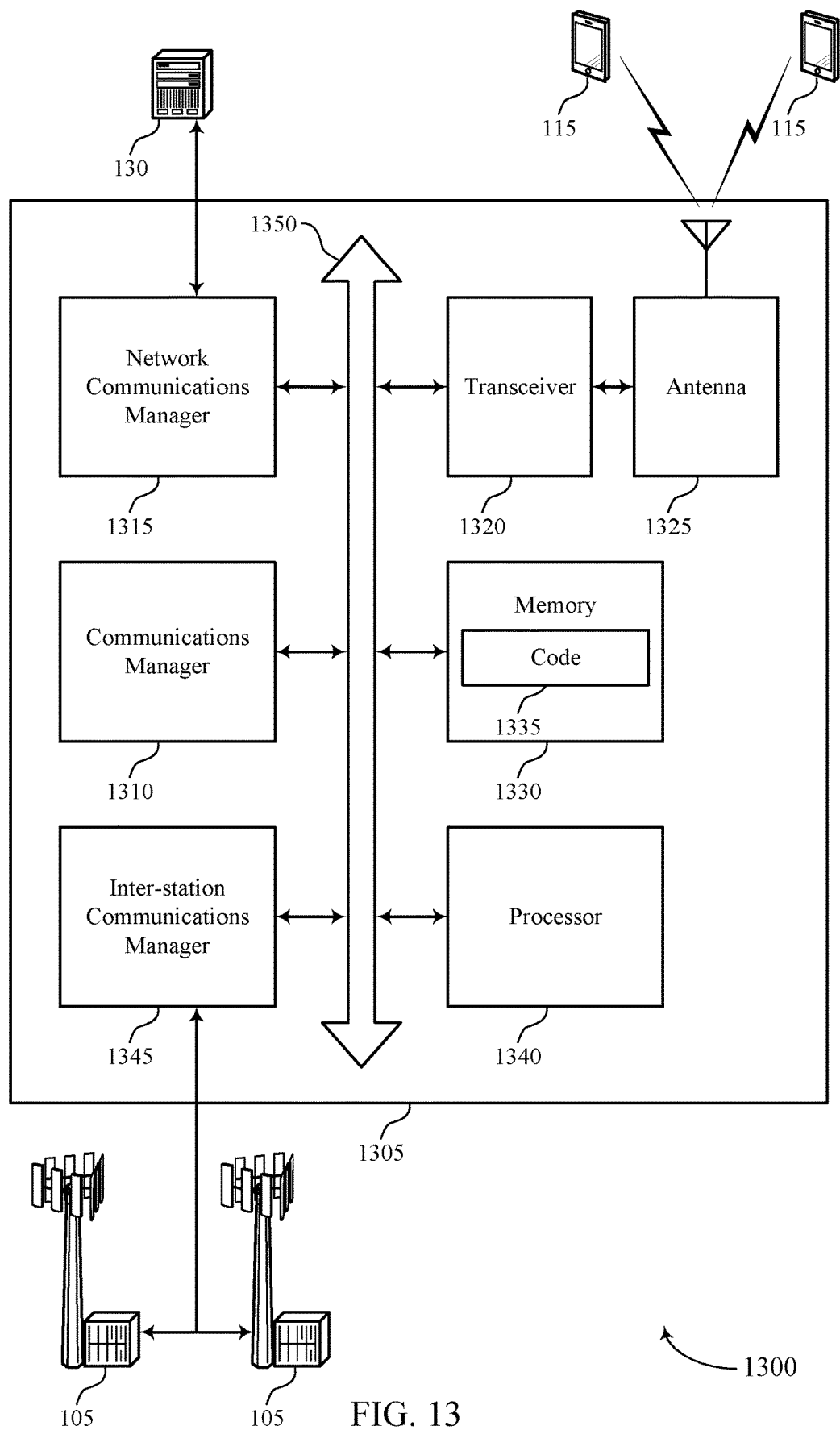
FIG. 13 shows a diagram of a system including a device that supports resource allocation constraint mitigation in accordance with aspects of the present disclosure.

FIG. 13 shows a diagram of a system 1300 including a device 1305 that supports resource allocation constraint mitigation in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may identify a capability of a transmitting device for communication of a time domain SC waveform with a receiving device, the capability indicating a limitation on a number of resources allocated for communicating the time domain SC waveform with the receiving device, determine a resource allocation for communicating the time domain SC waveform based on the limitation on the number of resources imposed by the UE, and indicate, to the transmitting device, the resource allocation for communicating the time domain SC waveform. In some aspects, a wireless cell of the receiving device may support the time domain SC waveform and a second waveform different from the time domain SC waveform. In some example aspects, a data sample timing of the time domain SC waveform may be aligned in time with a symbol boundary of a communication of the second waveform by at least one other transmitting device.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the device 1305 may include a single antenna 1325, or the device 1305 may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting resource allocation constraint mitigation).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
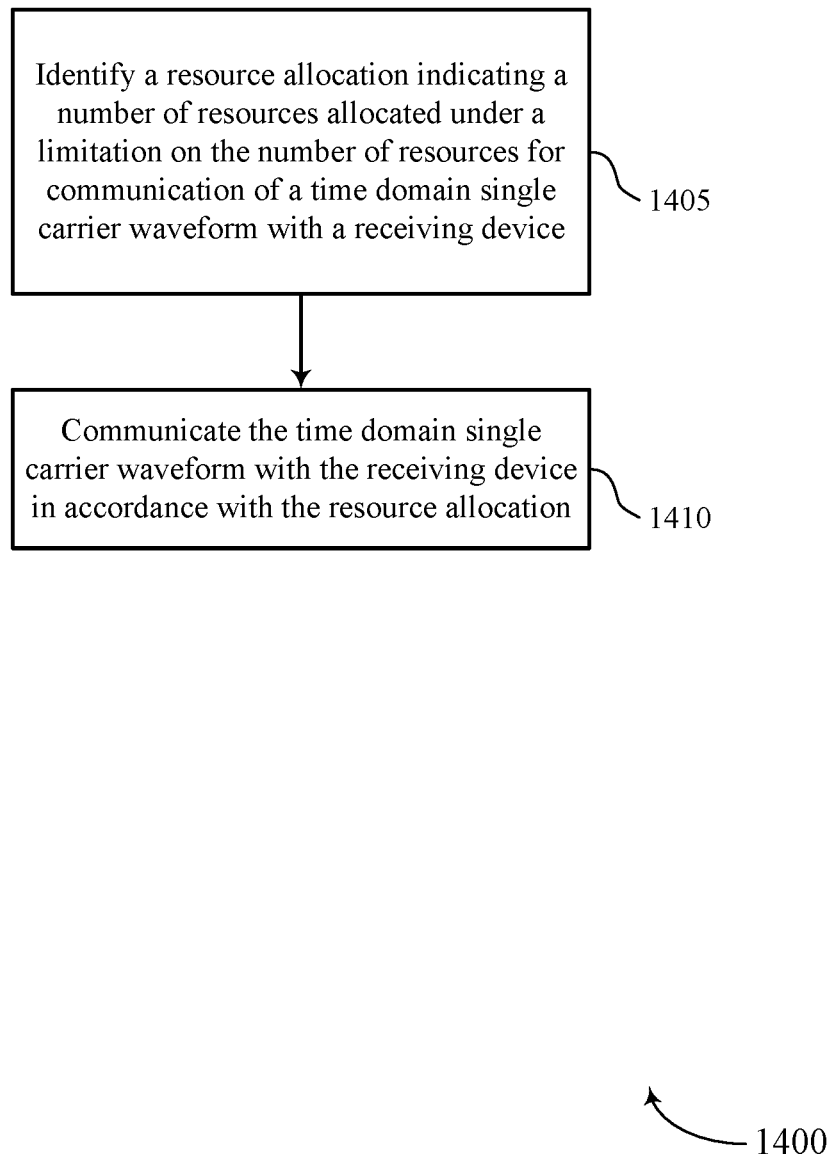
FIGS. 14 through 18 show flowcharts illustrating methods that support resource allocation constraint mitigation in accordance with aspects of the present disclosure.

FIG. 14 shows a flowchart illustrating a method 1400 that supports resource allocation constraint mitigation in accordance with aspects of the present disclosure. The operations of method 1400 may be implemented by a transmitting device (e.g., a UE 115 or base station 105) or its components as described herein. For example, the operations of method 1400 may be performed by a communications manager as described with reference to FIGS. 6 through 9. In some examples, a transmitting device may execute a set of instructions to control the functional elements of the UE to perform the functions described herein. Additionally or alternatively, a transmitting device may perform aspects of the functions described herein using special-purpose hardware.

At 1405, the transmitting device may identify a resource allocation indicating a number of resources allocated under a limitation on the number of resources for communication of a time domain SC waveform with a receiving device. In some aspects, the transmitting device may be operating in a wireless cell of the receiving device that may support the time domain SC waveform and a second waveform different from the time domain SC waveform. The operations of 1405 may be performed according to the methods described herein. In some examples, aspects of the operations of 1405 may be performed by an allocation receiver as described with reference to FIGS. 6 through 9. Additionally or alternatively, means for performing 1405 may, but not necessarily, include, for example, antenna 925, transceiver 920, communications manager 910, memory 930 (including code 935), processor 940 and/or bus 945.

At 1410, the transmitting device may communicate the time domain SC waveform with the receiving device in accordance with the resource allocation. In some example aspects, a data sample timing of the time domain SC waveform may be aligned in time with a symbol boundary of a communication of the second waveform by at least one other transmitting device. The operations of 1410 may be performed according to the methods described herein. In some examples, aspects of the operations of 1410 may be performed by a SC waveform manager as described with reference to FIGS. 6 through 9. Additionally or alternatively, means for performing 1410 may, but not necessarily, include, for example, antenna 925, transceiver 920, communications manager 910, memory 930 (including code 935), processor 940 and/or bus 945.

Figure 15:
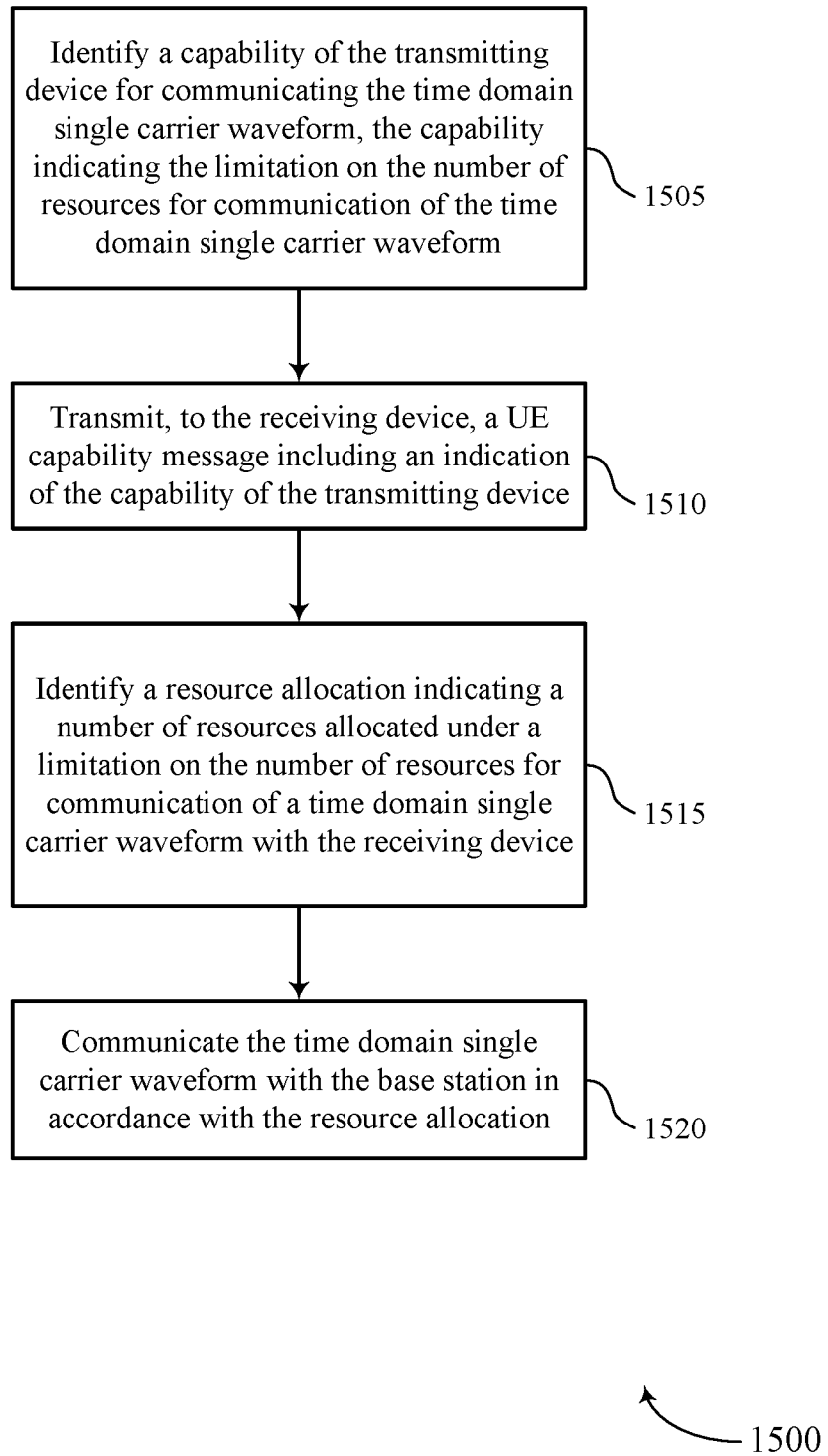

FIG. 15 shows a flowchart illustrating a method 1500 that supports resource allocation constraint mitigation in accordance with aspects of the present disclosure. The operations of method 1500 may be implemented by a transmitting device (e.g., a UE 115 or a base station 105) or its components as described herein. For example, the operations of method 1500 may be performed by a communications manager as described with reference to FIGS. 6 through 9. In some examples, a transmitting device may execute a set of instructions to control the functional elements of the transmitting device to perform the functions described herein. Additionally or alternatively, a transmitting device may perform aspects of the functions described herein using special-purpose hardware.

At 1505, the transmitting device may identify a capability of the transmitting device for communicating the time domain SC waveform, the capability indicating the limitation on the number of resources for communication of the time domain SC waveform. In some examples, the transmitting device may include a UE and the receiving device may include a base station. In some examples, the transmitting device may include a base station and the receiving device may include a UE. The operations of 1505 may be performed according to the methods described herein. In some examples, aspects of the operations of 1505 may be performed by a capability identifier as described with reference to FIGS. 6 through 9.

At 1510, in an example in which the transmitting device includes a UE and the receiving device includes a base station, the UE may transmit, to the receiving device (e.g., the base station), a UE capability message including an indication of the capability of the transmitting device (e.g., the UE). The operations of 1510 may be performed according to the methods described herein. In some examples, aspects of the operations of 1510 may be performed by a capability message transmitter as described with reference to FIGS. 6 through 9.

At 1515, the transmitting device may identify a resource allocation indicating a number of resources allocated under a limitation on the number of resources for communication of a time domain SC waveform with the receiving device. The operations of 1515 may be performed according to the methods described herein. In some examples, aspects of the operations of 1515 may be performed by an allocation receiver as described with reference to FIGS. 6 through 9.

At 1520, the transmitting device may communicate the time domain SC waveform with the receiving device in accordance with the resource allocation. The operations of 1520 may be performed according to the methods described herein. In some examples, aspects of the operations of 1520 may be performed by a SC waveform manager as described with reference to FIGS. 6 through 9.

Figure 16:
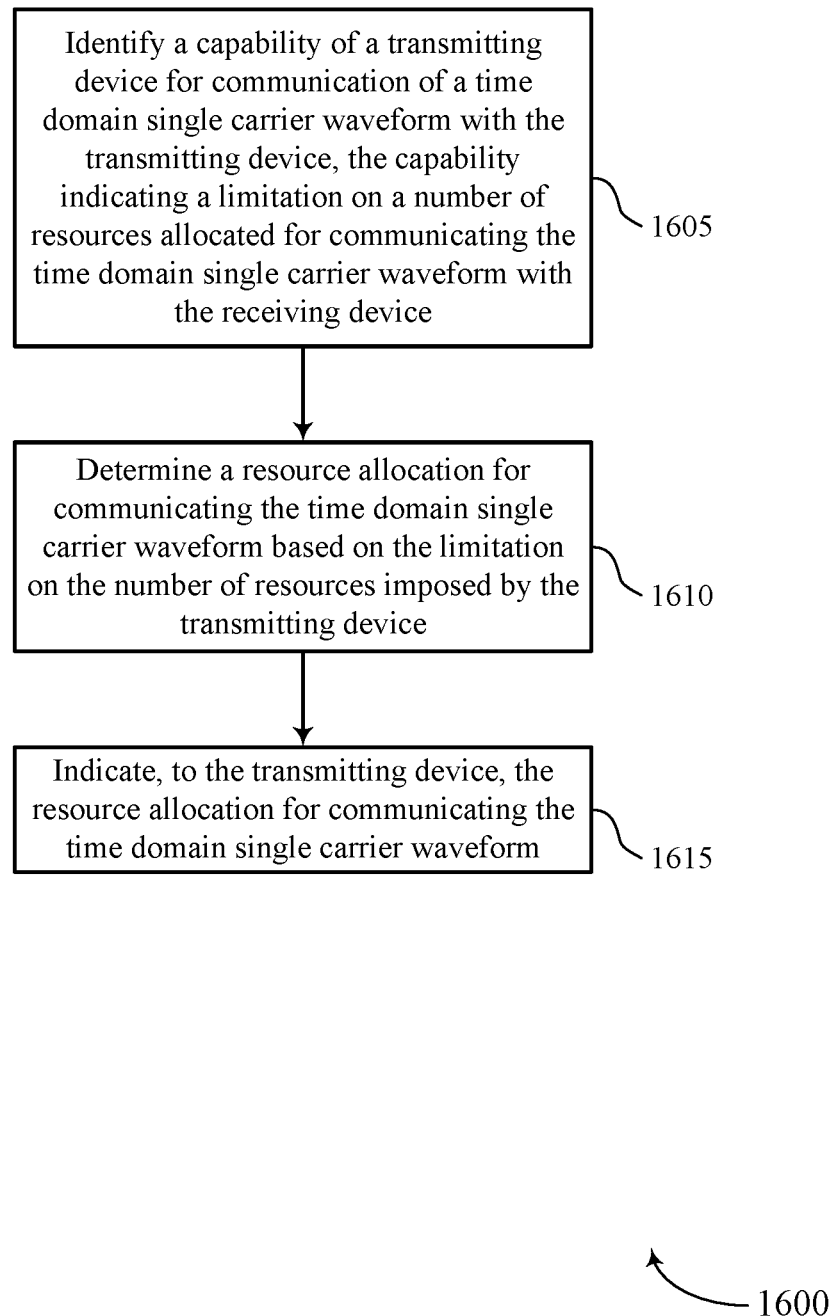

FIG. 16 shows a flowchart illustrating a method 1600 that supports resource allocation constraint mitigation in accordance with aspects of the present disclosure. The operations of method 1600 may be implemented by a receiving device (e.g., a base station 105) or its components as described herein. For example, the operations of method 1600 may be performed by a communications manager as described with reference to FIGS. 10 through 13. In some examples, a receiving device (e.g., a base station) may execute a set of instructions to control the functional elements of the base station to perform the functions described herein. Additionally or alternatively, a receiving device (e.g., a base station) may perform aspects of the functions described herein using special-purpose hardware.

At 1605, the receiving device may identify a capability of a transmitting device for communication of a time domain SC waveform with the receiving device, the capability indicating a limitation on a number of resources allocated for communicating the time domain SC waveform with the receiving device. In some aspects, a wireless cell of the receiving device may support the time domain SC waveform and a second waveform different from the time domain SC waveform. The operations of 1605 may be performed according to the methods described herein. In some examples, aspects of the operations of 1605 may be performed by a capability component as described with reference to FIGS. 10 through 13. Additionally or alternatively, means for performing 1605 may, but not necessarily, include, for example, antenna 1325, transceiver 1320, communications manager 1310, memory 1330 (including code 1335), processor 1340 and/or bus 1345.

At 1610, the receiving device may determine a resource allocation for communicating the time domain SC waveform based on the limitation on the number of resources imposed by the transmitting device. The operations of 1610 may be performed according to the methods described herein. In some examples, aspects of the operations of 1610 may be performed by a resource allocator as described with reference to FIGS. 10 through 13. Additionally or alternatively, means for performing 1610 may, but not necessarily, include, for example, antenna 1325, transceiver 1320, communications manager 1310, memory 1330 (including code 1335), processor 1340 and/or bus 1345.

At 1615, the receiving device may indicate, to the transmitting device, the resource allocation for communicating the time domain SC waveform. In some example aspects, a data sample timing of the time domain SC waveform may be aligned in time with a symbol boundary of a communication of the second waveform by at least one other transmitting device. The operations of 1615 may be performed according to the methods described herein. In some examples, aspects of the operations of 1615 may be performed by an indication component as described with reference to FIGS. 10 through 13. Additionally or alternatively, means for performing 1615 may, but not necessarily, include, for example, antenna 1325, transceiver 1320, communications manager 1310, memory 1330 (including code 1335), processor 1340 and/or bus 1345.

Figure 17:
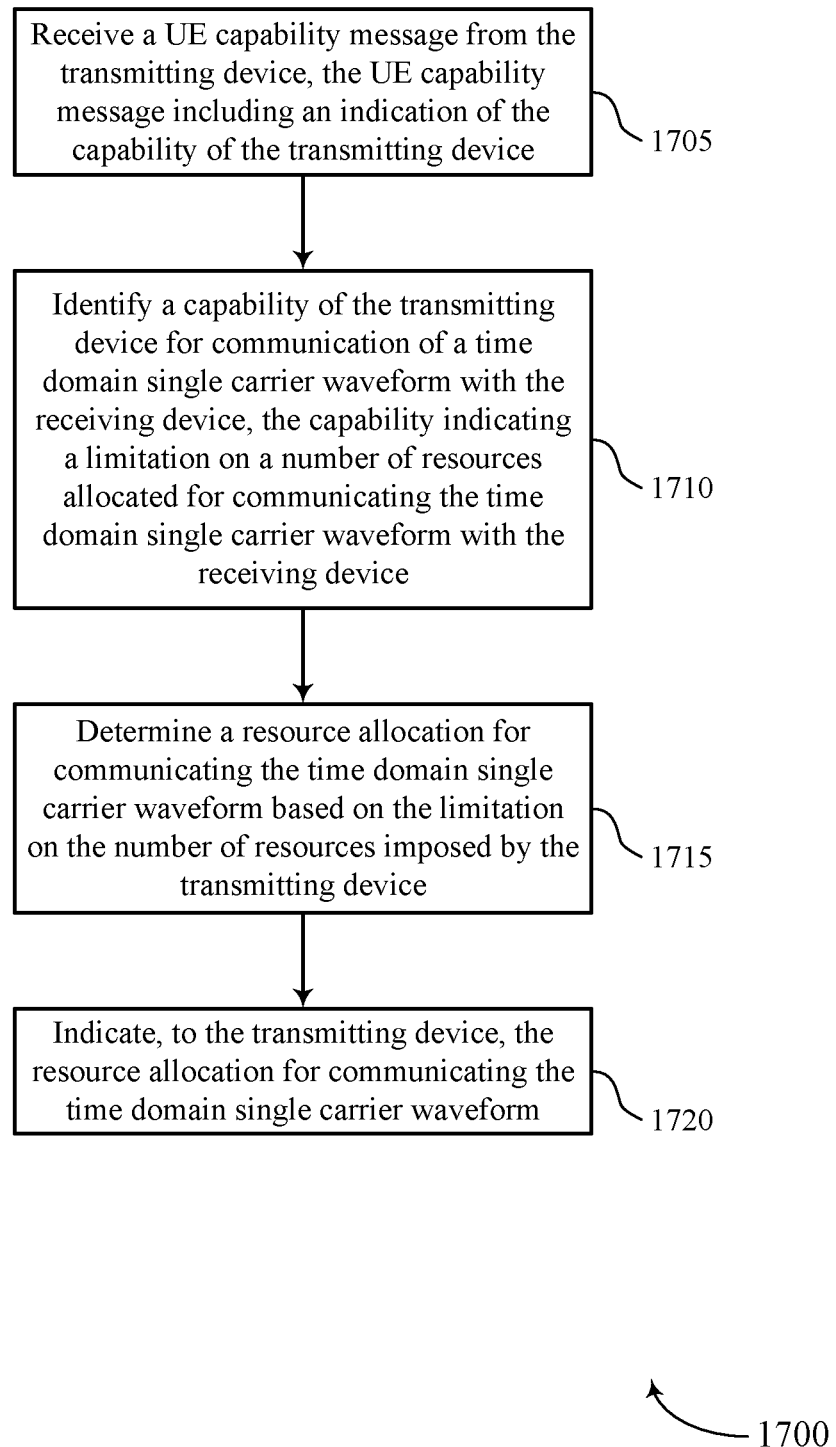

FIG. 17 shows a flowchart illustrating a method 1700 that supports resource allocation constraint mitigation in accordance with aspects of the present disclosure. The operations of method 1700 may be implemented by a receiving device (e.g., a base station 105) or its components as described herein. For example, the operations of method 1700 may be performed by a communications manager as described with reference to FIGS. 10 through 13. In some examples, a receiving device may execute a set of instructions to control the functional elements of the receiving device to perform the functions described herein. Additionally or alternatively, a receiving device may perform aspects of the functions described herein using special-purpose hardware.

At 1705, in an example in which the receiving device includes a base station and the transmitting device includes a UE, the receiving device (e.g., the base station) may receive a UE capability message from the transmitting device (e.g., the UE), the UE capability message including an indication of the capability of the transmitting device (e.g., the UE). The operations of 1705 may be performed according to the methods described herein. In some examples, aspects of the operations of 1705 may be performed by a capability receiver as described with reference to FIGS. 10 through 13.

At 1710, the receiving device may identify a capability of the transmitting device for communication of a time domain SC waveform with the receiving device, the capability indicating a limitation on a number of resources allocated for communicating the time domain SC waveform with the receiving device. The operations of 1710 may be performed according to the methods described herein. In some examples, aspects of the operations of 1710 may be performed by a capability component as described with reference to FIGS. 10 through 13.

At 1715, the receiving device may determine a resource allocation for communicating the time domain SC waveform based on the limitation on the number of resources imposed by the transmitting device. The operations of 1715 may be performed according to the methods described herein. In some examples, aspects of the operations of 1715 may be performed by a resource allocator as described with reference to FIGS. 10 through 13.

At 1720, the receiving device may indicate, to the transmitting device, the resource allocation for communicating the time domain SC waveform. The operations of 1720 may be performed according to the methods described herein. In some examples, aspects of the operations of 1720 may be performed by an indication component as described with reference to FIGS. 10 through 13.

Figure 18:
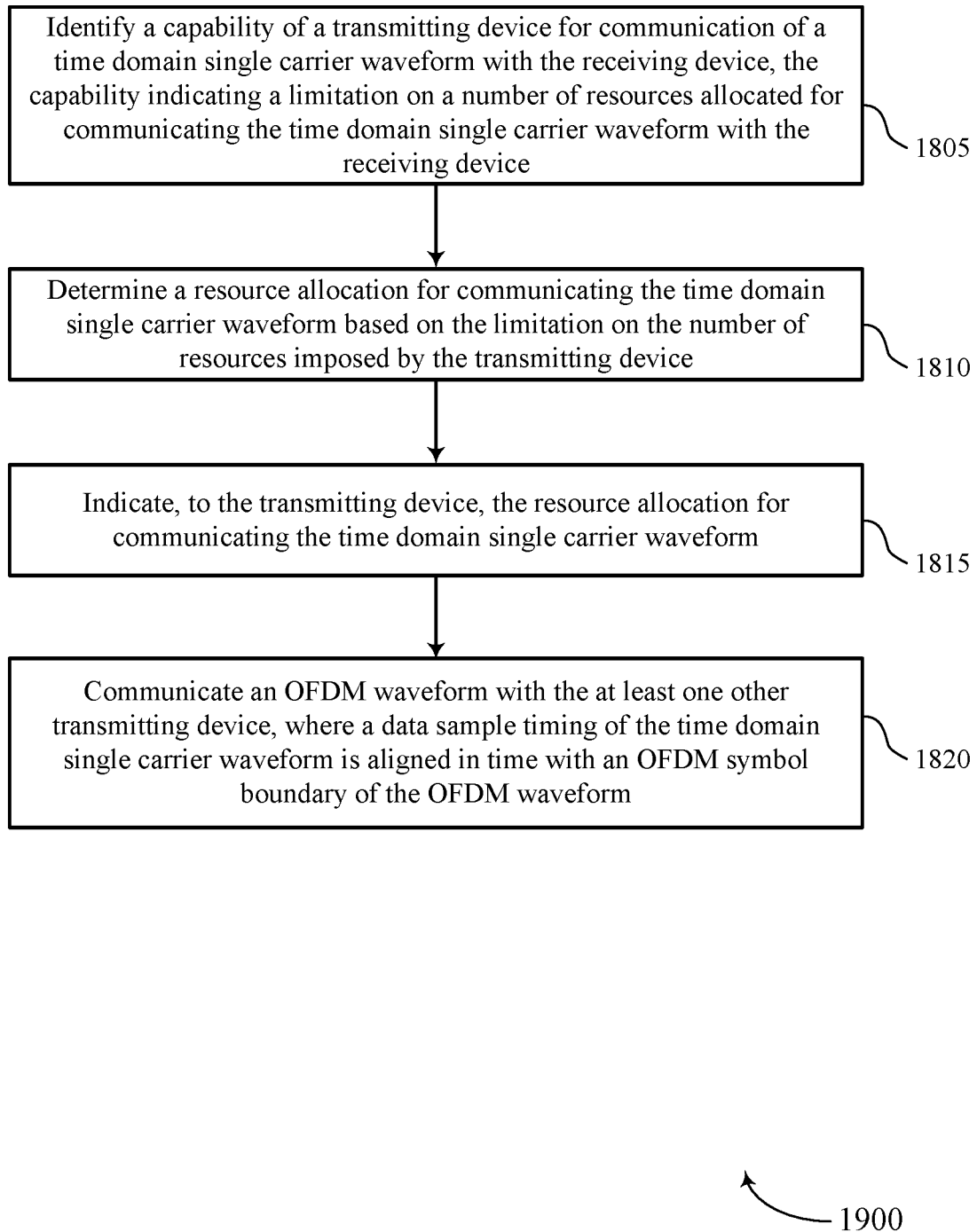

FIG. 18 shows a flowchart illustrating a method 1800 that supports resource allocation constraint mitigation in accordance with aspects of the present disclosure. The operations of method 1800 may be implemented by a receiving device (e.g., a base station 105) or its components as described herein. For example, the operations of method 1800 may be performed by a communications manager as described with reference to FIGS. 10 through 13. In some examples, a receiving device may execute a set of instructions to control the functional elements of the receiving device to perform the functions described herein. Additionally or alternatively, a receiving device may perform aspects of the functions described herein using special-purpose hardware.

At 1805, the receiving device may identify a capability of a transmitting device for communication of a time domain SC waveform with the receiving device, the capability indicating a limitation on a number of resources allocated for communicating the time domain SC waveform with the receiving device. The operations of 1805 may be performed according to the methods described herein. In some examples, aspects of the operations of 1805 may be performed by a capability component as described with reference to FIGS. 10 through 13.

At 1810, the receiving device may determine a resource allocation for communicating the time domain SC waveform based on the limitation on the number of resources imposed by the transmitting device. The operations of 1810 may be performed according to the methods described herein. In some examples, aspects of the operations of 1810 may be performed by a resource allocator as described with reference to FIGS. 10 through 13.

At 1815, the receiving device may indicate, to the transmitting device, the resource allocation for communicating the time domain SC waveform. The operations of 1815 may be performed according to the methods described herein. In some examples, aspects of the operations of 1815 may be performed by an indication component as described with reference to FIGS. 10 through 13.

At 1820, in an example in which the receiving device includes a base station, the transmitting device includes a UE, at least one other transmitting device includes at least one second UE, the receiving device (e.g., the base station) may communicate an OFDM waveform with the at least one other transmitting device (e.g., the at least one second UE), where the data sample timing of the time domain SC waveform is aligned in time with an OFDM symbol boundary of the OFDM waveform. The operations of 1820 may be performed according to the methods described herein. In some examples, aspects of the operations of 1820 may be performed by an OFDM waveform transceiver as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a transmitting device, comprising:
identifying a resource allocation indicating a number of resources allocated under a limitation on the number of resources for communication of a time domain single carrier waveform with a receiving device, wherein the transmitting device is operating in a wireless cell of the receiving device that supports the time domain single carrier waveform and a second waveform different from the time domain single carrier waveform; and
communicating the time domain single carrier waveform with the receiving device in accordance with the resource allocation,
wherein a data sample timing of the time domain single carrier waveform is aligned in time with a symbol boundary of a communication of the second waveform by at least one other transmitting device.

2. The method of claim 1, wherein the limitation on the number of resources is preconfigured at the transmitting device and the receiving device.

3. The method of claim 1, further comprising:
identifying a capability of the transmitting device for communicating the time domain single carrier waveform, the capability indicating the limitation on the number of resources for communication of the time domain single carrier waveform.

4. The method of claim 3, wherein the transmitting device comprises a user equipment (UE) and the receiving device comprises a base station, the method further comprising:
transmitting, to the base station, a UE capability message comprising an indication of the capability of the UE.

5. The method of claim 3, wherein the transmitting device comprises a base station and the receiving device comprises a user equipment (UE).

6. The method of claim 3, wherein the capability comprises a resampling ratio for the time domain single carrier waveform supported by the transmitting device, wherein the communicating comprises:
receiving or transmitting of the time domain single carrier waveform based at least in part on the resampling ratio.

7. The method of claim 6, wherein transmitting the time domain single carrier waveform comprises:
resampling a set of mapped information bits for the time domain single carrier waveform based at least in part on the resampling ratio; and
inserting a cyclic prefix (CP) or a guard interval into the resampled set of mapped information bits after the resampling.

8. The method of claim 7, wherein resampling the set of mapped information bits comprises:
transforming the set of mapped information bits into a frequency domain representation based at least in part on the number of resources;
inserting a set of zero values into the transformed set of mapped information bits based at least in part on the resampling ratio; and
transforming the frequency domain representation into a time domain representation of the time domain single carrier waveform based at least in part on the resampling ratio.

9. The method of claim 6, wherein the resampling ratio indicates a ratio between a set of resampled information bits in a time domain and a number of resources supported by the transmitting device.

10. The method of claim 6, wherein the resampling ratio is an integer value.

11. The method of claim 6, wherein the resampling ratio is fractional.

12. The method of claim 1, wherein:
the transmitting device comprises a user equipment (UE);
the at least one other transmitting device comprises at least one second UE;
the receiving device comprises a base station;
the UE and the at least one second UE are part of a group of UEs supported by the base station;
the at least one second UE of the group of UEs supports orthogonal frequency division multiplexed (OFDM) waveform communication with the base station; and
the communication of the second waveform by the at least one other transmitting device comprises an OFDM waveform communication by the at least one second UE.

13. The method of claim 12, wherein the data sample timing of the time domain single carrier waveform is aligned in time with an OFDM symbol boundary of the OFDM waveform communication of the at least one second UE.

14. The method of claim 1, wherein the number of resources corresponds to a number of resource elements (REs), a number of resource blocks (RBs), or any combination thereof.

15. A method for wireless communications at a receiving device, comprising:
identifying a capability of a transmitting device for communication of a time domain single carrier waveform with the receiving device, the capability indicating a limitation on a number of resources allocated for communicating the time domain single carrier waveform with the receiving device, wherein a wireless cell of the receiving device supports the time domain single carrier waveform and a second waveform different from the time domain single carrier waveform;
determining a resource allocation for communicating the time domain single carrier waveform based at least in part on the limitation on the number of resources imposed by the transmitting device; and
indicating, to the transmitting device, the resource allocation for communicating the time domain single carrier waveform,
wherein a data sample timing of the time domain single carrier waveform is aligned in time with a symbol boundary of a communication of the second waveform by at least one other transmitting device.

16. The method of claim 15, wherein the receiving device comprises a base station and the transmitting device comprises a user equipment (UE), the method further comprising:
receiving a UE capability message from the UE, the UE capability message comprising an indication of the capability of the UE.

17. The method of claim 15, wherein the limitation on the number of resources is preconfigured at the transmitting device and the receiving device.

18. The method of claim 15, wherein the capability of the transmitting device comprises a resampling ratio for the time domain single carrier waveform supported by the transmitting device, the method further comprising:
- determining the resource allocation based at least in part on the resampling ratio; and
- receiving or transmitting the time domain single carrier waveform according to the resource allocation based at least in part on the resampling ratio.

19. The method of claim 18, wherein transmitting the time domain single carrier waveform comprises:
- resampling a set of mapped information bits for the time domain single carrier waveform based at least in part on the resampling ratio; and
- inserting a cyclic prefix (CP) or a guard interval into the resampled set of mapped information bits after the resampling.

20. The method of claim 19, wherein resampling the set of mapped information bits comprises:
- transforming the set of mapped information bits into a frequency domain representation based at least in part on the number of resources;
- inserting a set of zero values into the transformed set of mapped information bits based at least in part on the resampling ratio; and
- transforming the frequency domain representation into a time domain representation of the time domain single carrier waveform based at least in part on the resampling ratio.

21. The method of claim 18, wherein the resampling ratio is an integer value.

22. The method of claim 18, wherein the resampling ratio is fractional.

23. The method of claim 15, wherein:
- the receiving device comprises a base station;
- the transmitting device comprises a user equipment (UE);
- the at least one other transmitting device comprises at least one second UE;
- the UE and the at least one second UE are part of a group of UEs supported by the base station;
- the at least one second UE of the group of UEs supports orthogonal frequency division multiplexed (OFDM) waveform communications with the base station; and
- the communication of the second waveform by the at least one other transmitting device comprises an OFDM waveform communication by the at least one second UE.

24. The method of claim 23, further comprising:
- communicating an OFDM waveform with the at least one second UE, wherein the data sample timing of the time domain single carrier waveform is aligned in time with an OFDM symbol boundary of the OFDM waveform.

25. The method of claim 15, wherein the number of resources corresponds to a number of resource elements (REs), a number of resource blocks (RBs), or any combination thereof.

26. An apparatus for wireless communications at a transmitting device, comprising:
- a processor of the transmitting device,
- memory in electronic communication with the processor, the memory and the processor configured to:
  - identify a resource allocation indicating a number of resources allocated under a limitation on the number of resources for communication of a time domain single carrier waveform with the receiving device, wherein the transmitting device is operating in a wireless cell of the receiving device that supports the time domain single carrier waveform and a second waveform different from the time domain single carrier waveform; and
  - communicate the time domain single carrier waveform with the receiving device in accordance with the resource allocation,
  - wherein a data sample timing of the time domain single carrier waveform is aligned in time with a symbol boundary of a communication of the second waveform by at least one other transmitting device.

27. The apparatus of claim 26, wherein:
- the transmitting device comprises a user equipment (UE);
- the at least one other transmitting device comprises at least one second UE;
- the receiving device comprises a base station;
- the UE and the at least one second UE are part of a group of UEs supported by the base station;
- the at least one second UE of the group of UEs supports orthogonal frequency division multiplexed (OFDM) waveform communication with the base station; and
- the communication of the second waveform by the at least one other transmitting device comprises an OFDM waveform communication by the at least one second UE.

28. The apparatus of claim 27, wherein the data sample timing of the time domain single carrier waveform is aligned in time with an OFDM symbol boundary of the OFDM waveform communication of the at least one second UE.

29. An apparatus for wireless communications at a receiving device, comprising:
- a processor of the receiving device,
- memory in electronic communication with the processor, the memory and the processor configured to:
  - identify a capability of a transmitting device for communication of a time domain single carrier waveform with the receiving device, the capability indicating a limitation on a number of resources allocated for communicating the time domain single carrier waveform with the receiving device, wherein a wireless cell of the receiving device supports the time domain single carrier waveform and a second waveform different from the time domain single carrier waveform;
  - determine a resource allocation for communicating the time domain single carrier waveform based at least in part on the limitation on the number of resources imposed by the transmitting device; and
  - indicate, to the transmitting device, the resource allocation for communicating the time domain single carrier waveform,
  - wherein a data sample timing of the time domain single carrier waveform is aligned in time with a symbol boundary of a communication of the second waveform by at least one other transmitting device.

30. The apparatus of claim 29, wherein:
- the receiving device comprises a base station;
- the transmitting device comprises a user equipment (UE);
- the at least one other transmitting device comprises at least one second UE;
- the UE and the at least one second UE are part of a group of UEs supported by the base station;
- the at least one second UE of the group of UEs supports orthogonal frequency division multiplexed (OFDM) waveform communication with the base station; and the communication of the second waveform by the at least one other transmitting device comprises an OFDM waveform communication by the at least one second UE.

* * * * *